US011637798B2

(12) United States Patent
Hassan

(10) Patent No.: US 11,637,798 B2
(45) Date of Patent: Apr. 25, 2023

(54) CONTROLLED DISPLAY OF RELATED MESSAGE THREADS

(71) Applicant: MICROSOFT TECHNOLOGY LICENSING, LLC, Redmond, WA (US)

(72) Inventor: Amer Aref Hassan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/333,004

(22) Filed: May 27, 2021

(65) Prior Publication Data

US 2022/0385609 A1 Dec. 1, 2022

(51) Int. Cl.
| | | |
|---|---|---|
| *G06F 15/16* | (2006.01) | |
| *H04L 51/216* | (2022.01) | |
| *G06F 3/0482* | (2013.01) | |
| *H04L 51/212* | (2022.01) | |
| *H04L 51/214* | (2022.01) | |

(52) U.S. Cl.
CPC .......... *H04L 51/216* (2022.05); *G06F 3/0482* (2013.01); *H04L 51/212* (2022.05); *H04L 51/214* (2022.05)

(58) Field of Classification Search
CPC ....... H04L 51/16; H04L 51/04; H04L 51/216; H04L 51/214; H04L 51/212; G06Q 10/107; G06Q 10/10
USPC ....................................................... 709/206
See application file for complete search history.

(56) References Cited

U.S. PATENT DOCUMENTS

| | | | |
|---|---|---|---|
| 3,555,178 A | 1/1971 | Humiston | |
| 6,515,681 B1 * | 2/2003 | Knight | ................. G06Q 10/107 715/968 |
| 7,328,242 B1 | 2/2008 | Mccarthy et al. | |

(Continued)

FOREIGN PATENT DOCUMENTS

| | | |
|---|---|---|
| WO | 2015005606 A1 | 1/2015 |
| WO | 2019023974 A1 | 2/2019 |

OTHER PUBLICATIONS

"Manually Merge Conversations", Retrieved from: https://web.archive.org/web/20210123110154/https://help.frontapp.com/t/x1249I/manually-merge-conversations, Retrieved Date: Jan. 23, 2021, 9 Pages.

(Continued)

*Primary Examiner* — Anthony Mejia
(74) *Attorney, Agent, or Firm* — Scott Y. Shigeta; Newport IP, LLC

(57) ABSTRACT

The techniques disclosed herein provide a system that can identify two or more independently managed message threads and modify a user interface to enable a common user of the threads to view messages of both threads. For instance, if a user is participating in a first chat session that is displayed within a first message thread, the system can identify other threads that are related to the first thread. The related threads can be identified by a user input or by a query performed by a system. In some embodiments, the system can only search for threads that have at least one common user to the first thread. The system can provide this display of two related threads while linking the threads but not merging the messages of the threads. A data structure can be maintained to control the display of each thread.

20 Claims, 15 Drawing Sheets

(56) References Cited

U.S. PATENT DOCUMENTS

| | | | |
|---|---|---|---|
| 7,383,307 B2 | 6/2008 | Kirkland et al. | |
| 7,620,407 B1 | 11/2009 | Donald et al. | |
| 7,725,538 B2 | 5/2010 | Kirkland et al. | |
| 7,788,599 B2 * | 8/2010 | Michaud | G06F 3/0482 715/810 |
| 7,904,515 B2 * | 3/2011 | Ambati | G06Q 10/10 709/205 |
| 7,962,555 B2 | 6/2011 | Sastry et al. | |
| 8,001,184 B2 | 8/2011 | Etgen et al. | |
| 8,103,970 B1 * | 1/2012 | Allen | G06F 3/0488 715/764 |
| 8,190,999 B2 | 5/2012 | Chen et al. | |
| 8,762,475 B2 | 6/2014 | Yang et al. | |
| 9,219,704 B2 | 12/2015 | Hamlin et al. | |
| 9,275,118 B2 * | 3/2016 | Brezina | G06F 3/0481 |
| 9,344,389 B2 | 5/2016 | Hind et al. | |
| 9,847,959 B2 | 12/2017 | Akavaram et al. | |
| 10,116,599 B2 | 10/2018 | Wu et al. | |
| 10,356,025 B2 | 7/2019 | Allen et al. | |
| 10,509,531 B2 | 12/2019 | Sharifi et al. | |
| 10,523,613 B1 | 12/2019 | Alm et al. | |
| 10,587,539 B2 * | 3/2020 | Mahood | H04L 51/04 |
| 10,601,753 B2 | 3/2020 | Draeger et al. | |
| 10,819,532 B1 | 10/2020 | Van Rensburg et al. | |
| 10,862,840 B2 * | 12/2020 | Claux | G06F 3/04842 |
| 10,901,603 B2 | 1/2021 | Boothroyd et al. | |
| 10,977,258 B1 | 4/2021 | Liu et al. | |
| 10,979,377 B1 * | 4/2021 | Gupta | G06Q 10/10 |
| 11,093,125 B1 * | 8/2021 | van Doorn | G06F 3/04842 |
| 11,153,235 B1 | 10/2021 | Dalonzo et al. | |
| 11,165,739 B1 * | 11/2021 | Dodsworth | G06F 40/134 |
| 2004/0078435 A1 | 4/2004 | Dunbar et al. | |
| 2005/0149621 A1 | 7/2005 | Kirkland et al. | |
| 2005/0262199 A1 | 11/2005 | Chen et al. | |
| 2008/0082607 A1 | 4/2008 | Sastry et al. | |
| 2009/0083389 A1 | 3/2009 | Kirkland et al. | |
| 2009/0313334 A1 | 12/2009 | Seacat et al. | |
| 2010/0017483 A1 | 1/2010 | Estrada | |
| 2011/0029898 A1 | 2/2011 | Malik | |
| 2011/0126126 A1 | 5/2011 | Blair | |
| 2011/0185288 A1 | 7/2011 | Gupta et al. | |
| 2012/0317499 A1 | 12/2012 | Shen | |
| 2014/0096033 A1 | 4/2014 | Blair | |
| 2014/0201216 A1 | 7/2014 | Bryant et al. | |
| 2014/0223347 A1 | 8/2014 | Seo et al. | |
| 2014/0245178 A1 | 8/2014 | Smith et al. | |
| 2014/0279716 A1 | 9/2014 | Cormack et al. | |
| 2014/0310365 A1 | 10/2014 | Sample et al. | |
| 2015/0081713 A1 | 3/2015 | Kandylas et al. | |
| 2015/0324424 A1 | 11/2015 | Bhide et al. | |
| 2016/0065519 A1 | 3/2016 | Waltermann et al. | |
| 2016/0117384 A1 | 4/2016 | Akavaram et al. | |
| 2016/0119265 A1 | 4/2016 | Akavaram et al. | |
| 2016/0260176 A1 | 9/2016 | Bernard et al. | |
| 2016/0364368 A1 | 12/2016 | Chen et al. | |
| 2017/0149713 A1 | 5/2017 | Bastide et al. | |
| 2017/0272388 A1 | 9/2017 | Bern et al. | |
| 2017/0351385 A1 | 12/2017 | Ertmann et al. | |
| 2017/0353414 A1 | 12/2017 | Ertmann et al. | |
| 2018/0041452 A1 | 2/2018 | Reading et al. | |
| 2018/0046628 A1 | 2/2018 | Wang et al. | |
| 2018/0048604 A1 | 2/2018 | Mikhailov et al. | |
| 2018/0165723 A1 | 6/2018 | Wright et al. | |
| 2018/0287982 A1 | 10/2018 | Draeger et al. | |
| 2018/0324116 A1 | 11/2018 | Vaduva | |
| 2018/0356952 A1 | 12/2018 | Boothroyd et al. | |
| 2019/0014065 A1 * | 1/2019 | Lim | H04L 51/212 |
| 2019/0121907 A1 | 4/2019 | Brunn et al. | |
| 2019/0245821 A1 | 8/2019 | Crowe et al. | |
| 2019/0281001 A1 | 9/2019 | Miller et al. | |
| 2020/0106731 A1 | 4/2020 | Goenka et al. | |
| 2020/0344082 A1 | 10/2020 | Vuskovic et al. | |
| 2021/0152506 A1 | 5/2021 | Liu et al. | |
| 2021/0319216 A1 | 10/2021 | Anderson | |
| 2022/0385605 A1 | 12/2022 | Hassan et al. | |
| 2022/0385606 A1 | 12/2022 | Hassan et al. | |
| 2022/0385607 A1 | 12/2022 | Hassan | |
| 2022/0385608 A1 | 12/2022 | Hassan et al. | |

OTHER PUBLICATIONS

Clover, Juli, "iOS 14: Everything New in Messages", Retrieved from: https://www.macrumors.com/guide/messages, Jan. 22, 2021, 14 Pages.

Tan et al., "Context-Aware Conversation Thread Detection in Multi-Party Chat", In Proceedings of the Conference on Empirical Methods in Natural Language Processing, Nov. 3, 2019, pp. 6456-6461.

"Add a Chat Activity in Moodle", Retrieved From: https://web.archive.org/web/20171206184009/https://www.umass.edu/it/support/moodle/add-a-chat-activity-moodle, Dec. 6, 2017, 12 Pages.

"How Do I Use Split Window View in Skype on Desktop?", Retrieved From: https://web.archive.org/web/20191115043649/https:/support.skype.com/en/faq/FA34880/how-do-i-use-split-window-view-in-skype-on-desktop, Nov. 15, 2019, 4 Pages.

"Microsoft Teams Resource and Training", Retrieved From: https://web.archive.org/web/20200626055701/https:/www.cityofbowie.org/2503/Microsoft-Teams-Resource-and-Training, Jun. 26, 2020, 6 Pages.

"Pop Out a Chat in Teams", Retrieved From: https://support.microsoft.com/en-gb/office/pop-out-a-chat-in-teams-cff95cb0-34af-423f-8f69-fe9106973790, Retrieved on: Feb. 9, 2021, 4 Pages.

"Pre-Assigning Participants to Breakout Rooms", Retrieved From: https://web.archive.org/web/20210203172424/https:/support.zoom.us/hc/en-us/articles/360032752671-Pre-assigning-participants-to-breakout-rooms, Feb. 3, 2021, 6 Pages.

"Use Emergency SOS on your Apple Watch", Retrieved from: https://web.archive.org/web/20200604141648/https://support.apple.com/en-in/HT206983, Jun. 4, 2020, 4 Pages.

"Use Threads to Organise Discussions", Retrieved From: https://web.archive.org/web/20201104193149/https:/slack.com/intl/en-in/help/articles/115000769927-Use-threads-to-organise-discussions-, Nov. 4, 2020, 3 Pages.

"Non Final Office Action Issued in U.S. Appl. No. 17/332,877", dated Apr. 28, 2022, 23 Pages.

"Final Office Action Issued in U.S. Appl. No. 17/332,921", dated Apr. 26, 2022, 34 Pages.

"Non Final Office Action Issued in U.S. Appl. No. 17/332,921", dated Oct. 26, 2021, 30 Pages.

"Final Office Action Issued in U.S. Appl. No. 17/332,958", dated Apr. 26, 2022, 24 Pages.

"Non Final Office Action Issued in U.S. Appl. No. 17/332,958", dated Oct. 26, 2021, 23 Pages.

Abu-Jbara, et al., "Subgroup Detector: A System for Detecting Subgroups in Online Discussions", In Proceedings of the 50th Annual Meeting of the Association for Computational Linguistics, Jul. 8, 2012, pp. 133-138.

Adam, Alexandre, "Manage Your Layout", Retrieved From: https://support.symphony.com/hc/en-us/articles/360000701066-Manage-your-layout, Apr. 29, 2019, 1 Page.

Adams, et al., "Topic Detection and Extraction in Chat", In Proceedings of the IEEE International Conference on Semantic Computing, Aug. 4, 2008, pp. 581-588.

Bengel, et al., "ChatTrack: Chat Room Topic Detection Using Classification", In Proceedings of the Conference Paper in Lecture Notes in Computer Science, Mar. 2004, 11 Pages.

Constine, Josh, "Chat Multi-Tasking, Facebook Home's Game Changer, Could Rattle Apple and Google", Retrieved From: https://techcrunch.com/2013/04/07/chat-multi-tasking/?_ga=2.84845273.1340773396.1613973171-1987933572.1611813039&guccounter=1, Apr. 7, 2013, 5 Pages.

Li, Helena, "How to Move Messages and Split Conversations", Retrieved From: https://web.archive.org/web/20200804224723/https:/help.frontapp.com/t/632vp7/how-to-move-messages-and-split-conversations, Jul. 7, 2020, 5 Pages.

(56) References Cited

OTHER PUBLICATIONS

Hutchinson, Andrew, "Facebook's Adding Post Topics to More Groups, Helping to Better Organize Relevant Discussion", Retrieved From: https://www.socialmediatoday.com/news/facebooks-adding-post-topics-to-more-groups-helping-to-better-organize-re/564699/, Oct. 10, 2019, 1 Page.
U.S. Appl. No. 17/332,877, filed May 27, 2021.
U.S. Appl. No. 17/332,921, filed May 27, 2021.
U.S. Appl. No. 17/332,958, filed May 27, 2021.
U.S. Appl. No. 17/332,991, filed May 27, 2021.
"International Search Report and Written Opinion Issued in PCT Application No. PCT/US22/027187", dated Jul. 11, 2022, 13 Pages.
"International Search Report and Written Opinion Issued in PCT Application No. PCT/US22/027194", dated Jul. 11, 2022, 14 Pages.
"International Search Report and Written Opinion Issued in PCT Application No. PCT/US22/026870", dated Jul. 26, 2022, 14 Pages.
"International Search Repod and Written Opinion Issued in PCT Application No. PCT/US22/027188", dated Aug. 2, 2022, 10 Pages.
"International Search Report and Written Opinion Issued in PCT Application No. PCT/US22/027192", dated Aug. 10, 2022, 11 Pages.
"Notice of Allowance Issued in U.S. Appl. No. 17/332,991", dated Aug. 31, 2022, 13 Pages.
"Final Office Action Issued in U.S. Appl. No. 17/332,877", dated Dec. 13, 2022, 26 Pages.
"Non Final Office Action Issued in U.S. Appl. No. 17/332,958", dated Feb. 15, 2023, 27 Pages.
"Notice of Allowance Issued in U.S. Appl. No. 17/332,991", dated Feb. 2, 2023, 12 Pages.

\* cited by examiner

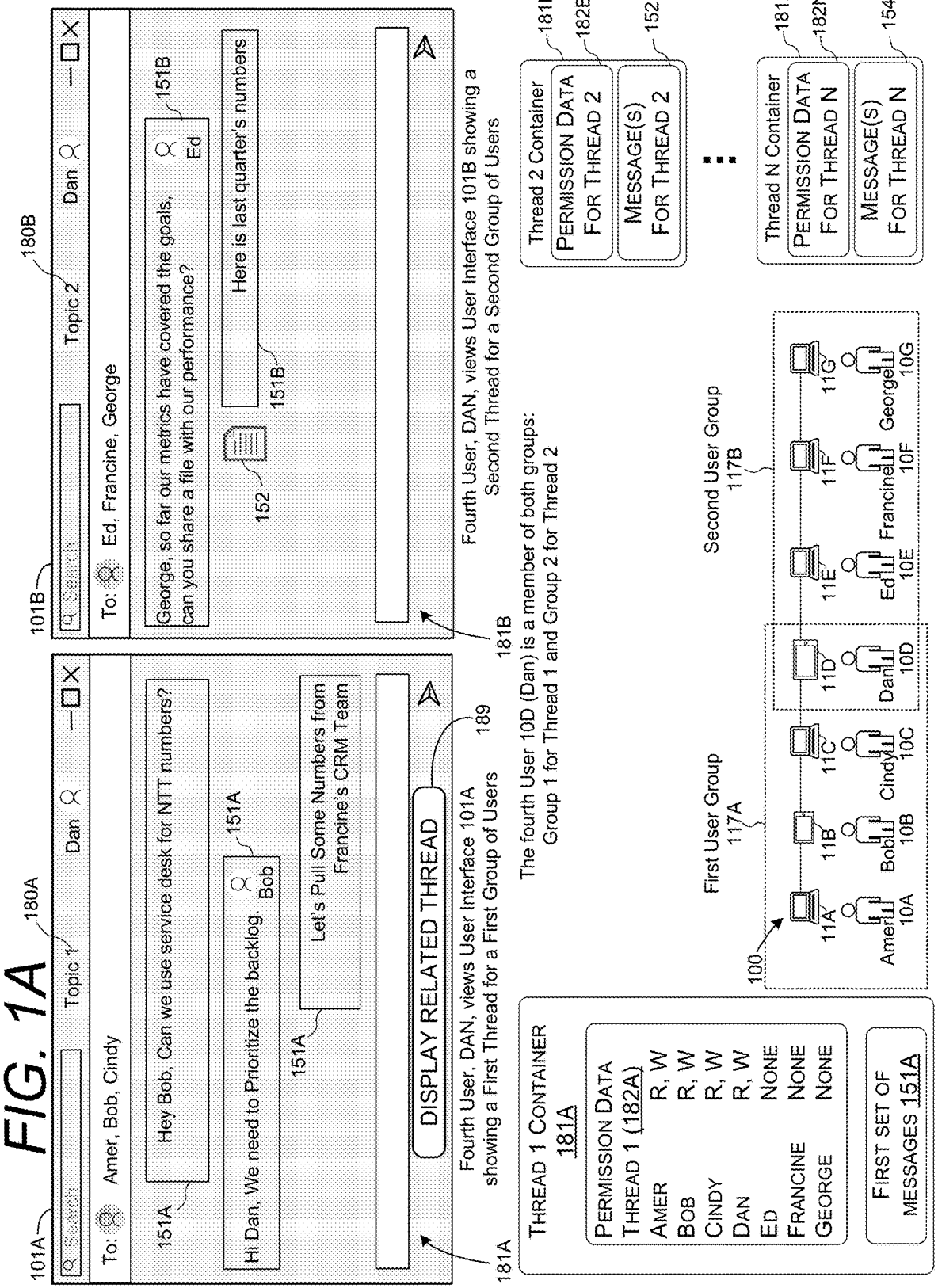

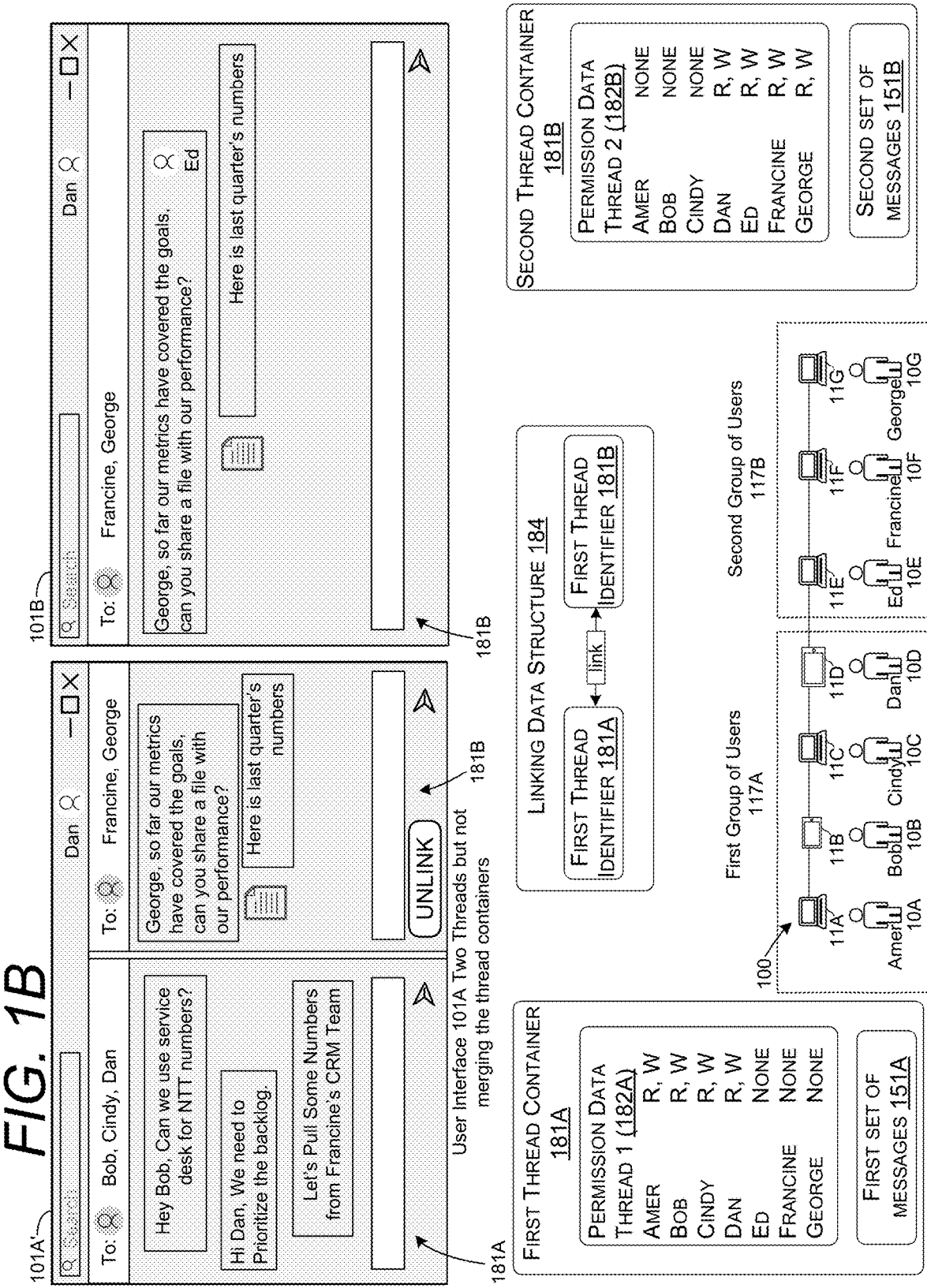

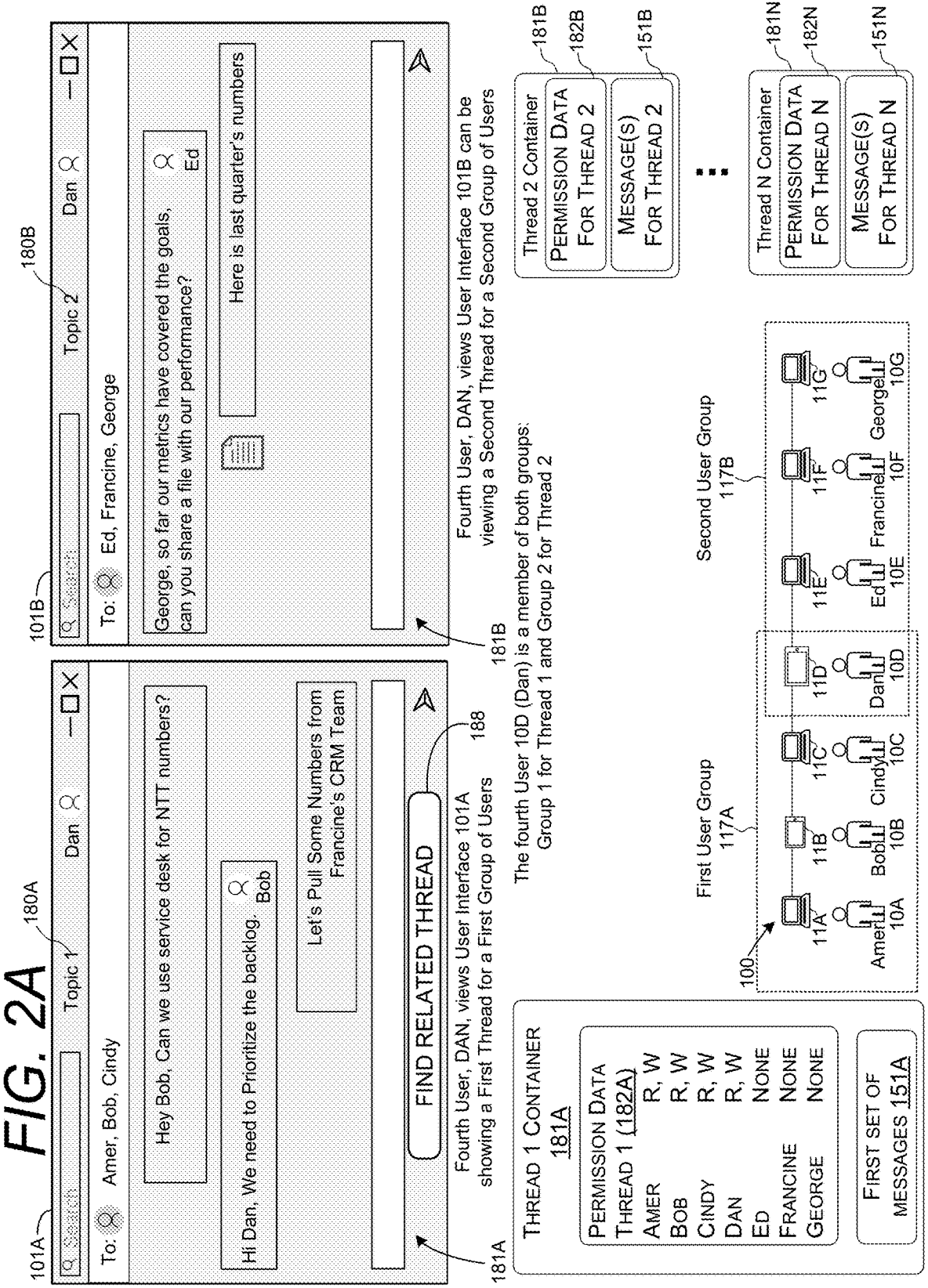

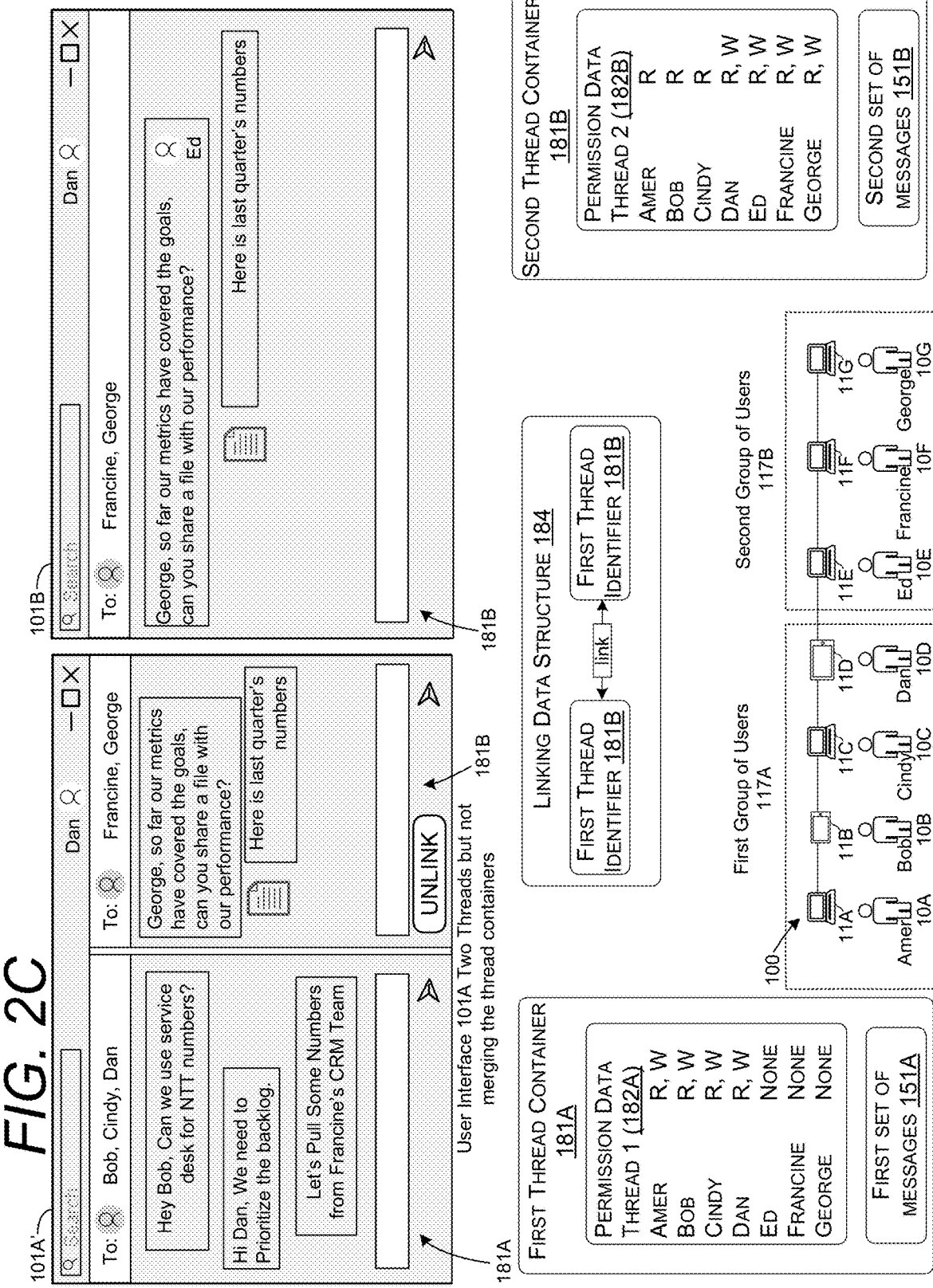

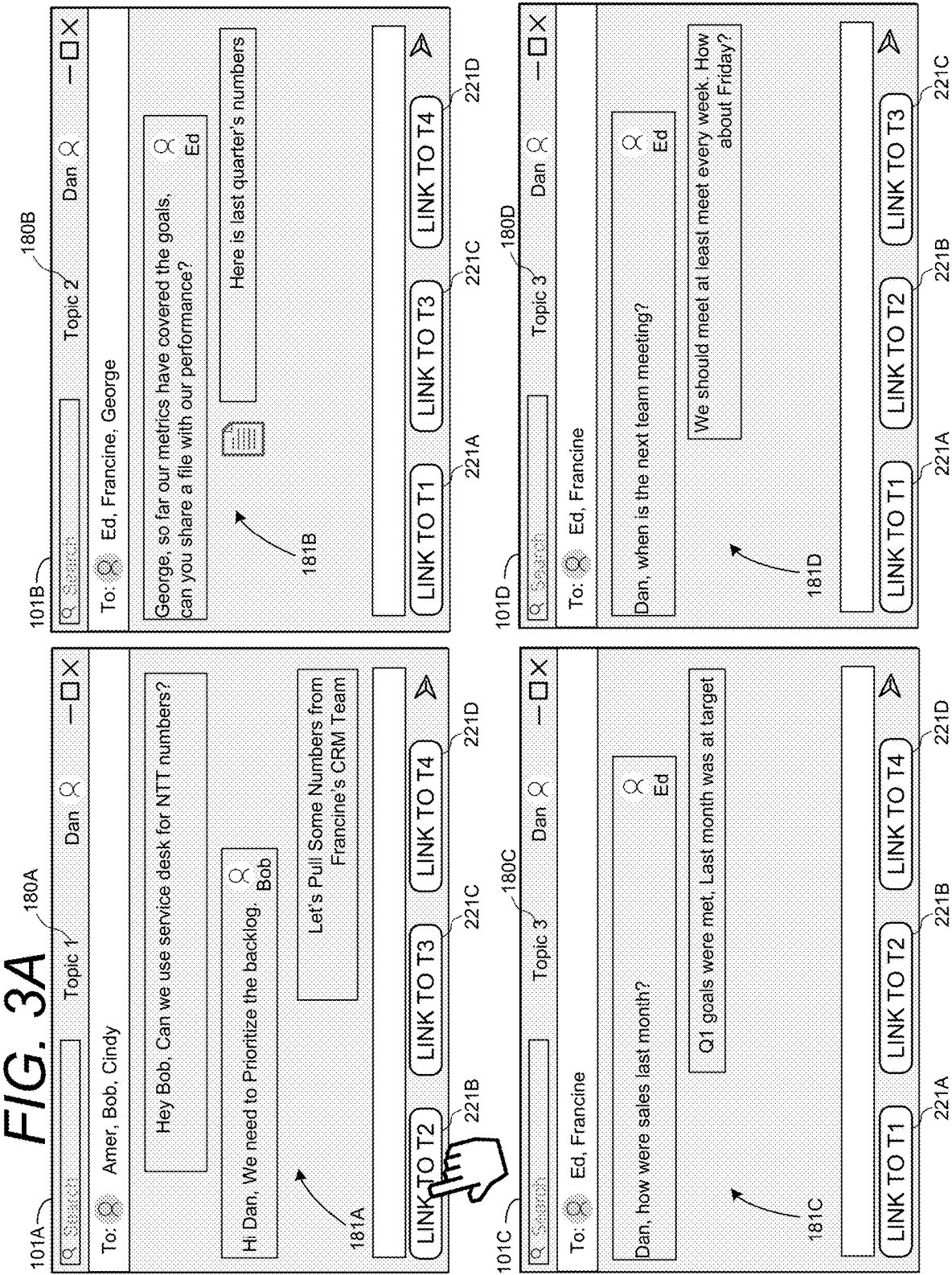

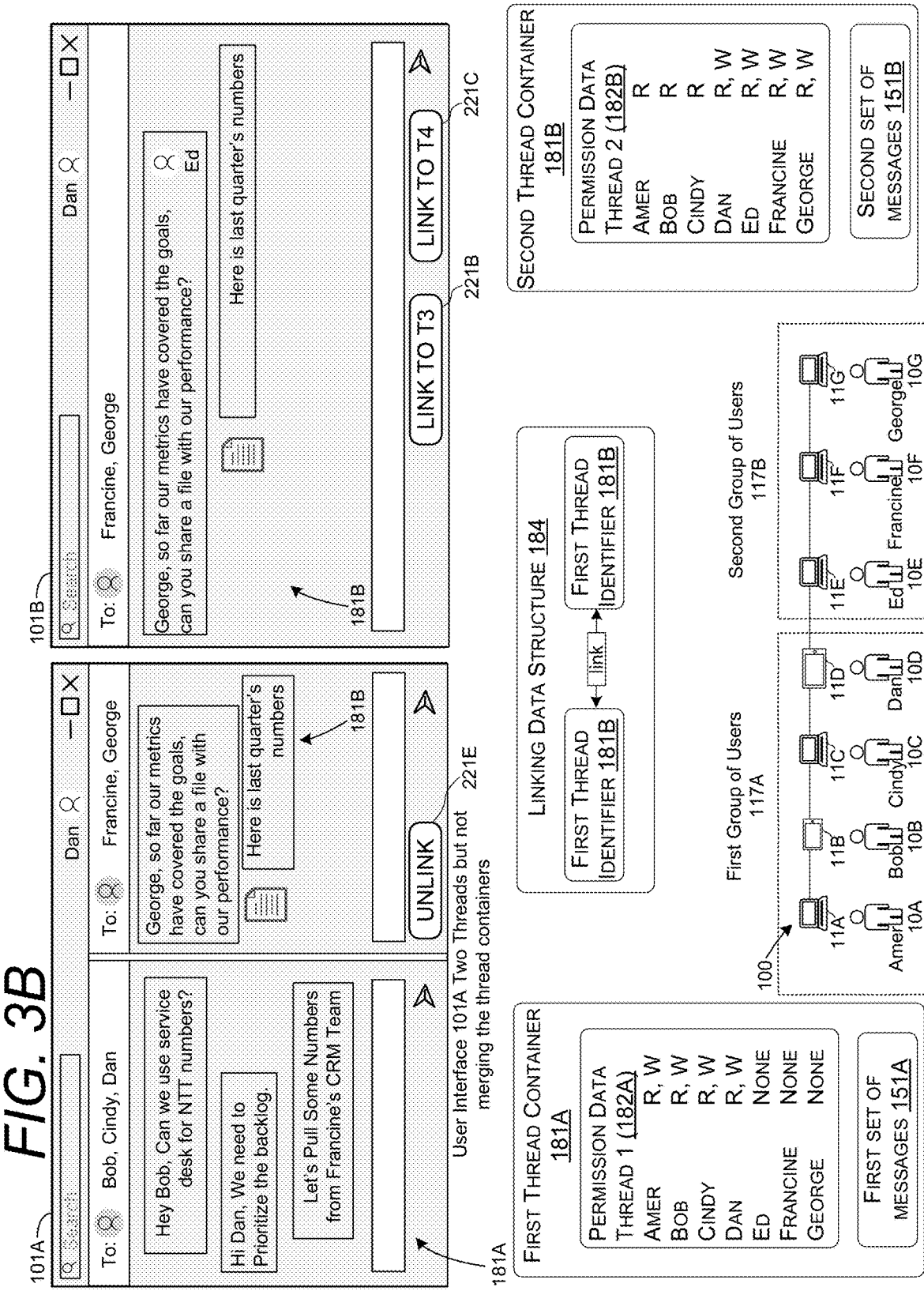

CONTROLLED DISPLAY OF RELATED MESSAGE THREADS

BACKGROUND

There are a number of different types of communication systems that allow users to collaborate. For example, some systems allow people to collaborate by sharing meeting chat messages, group chat messages, emails, etc. Although these systems can be useful for allowing users to coordinate and share ideas, some existing systems have a number of drawbacks. For instance, some systems do not organize messages in a way that allows users to optimally manage large amounts of information. When a user has a number of messages within a thread, it may be difficult for a user to monitor all of the messages. This can be particularly difficult when a user has several topics within each chat thread. In some cases, a user may have many topics without a thread and hundreds or thousands of messages with a large number of people. When managing many message threads, users can become unaware of the different topics being discussed and miss important content and tasks.

The aforementioned shortcomings, and others, can lead to an inefficient user interaction model and lead to inefficient use of computing systems. If users miss salient information within a conversation, that causes users to produce redundant messages, prolonged meetings or other duplicated efforts to retrieve and review missed content, which can lead to redundant use of network resources, storage resources, and processing resources.

SUMMARY

The techniques disclosed herein provide a system that can identify two or more independently managed message threads and modify a user interface to enable a user that is common to the threads to view related messages from different threads. For instance, if a user is participating in a first chat session that is displayed within a first message thread, the system can identify other message threads that are related to the first message thread. The search for the related message threads can be limited to message threads that the user is participating in. In some embodiments, the system will only search for and display message threads that have at least one common user to the first message thread. The related message threads can be displayed concurrently with the first thread. In some configurations, the related message threads can be displayed in a side-by-side user interface that is split to accommodate a display of the first thread and the related threads. The system can provide this display of two or more threads while linking the threads but not merging the messages of the threads. A data structure may be utilized to link the message threads to enable a system to automatically display the threads together when one of the threads is recalled. The linked message threads can also maintain and modify access permissions for the threads as they are discovered in the search queries and linked to one another.

The techniques disclosed herein can provide a number of technical benefits. For instance, a system can maintain control of access permissions for various threads while modifying the display of multiple message threads. Security of data can be maintained and controlled at more granular levels while different threads can be linked to one another. In addition, the techniques disclosed herein can provide a computing device that can effectively display information in a format that can allow a user to see a broader perspective of content that they are sharing with other users. By enabling a system to concurrently display related information from different threads while also allowing each thread to be independently managed by a user, e.g., the message threads are not merged, a system can provide an organized view of information that can reduce the probability that a user may miss salient information. In addition, by linking each related message thread, a system can also improve its efficiency by generating a user interface that allows a user to readily view related message threads as they access the threads in the future. This can help with the efficiency of a computing device in that a user can spend less time interacting with the computer to find related threads each time they interact with individual threads. This can be particularly helpful when the user is interacting with dozens of message threads, closes the message threads, and later returns to the message threads. In this scenario, links that are created between the message threads can help a user recall the related message threads without requiring a computer to duplicate search queries or requiring a user to perform search queries.

The disclosed system can also increase the efficiency of a user's interaction with a device. When information is organized more accurately according to a user's needs, a user is less likely to miss salient information. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The efficiencies of the analysis of a select message can also lead to other efficiencies. In particular, by displaying messages more accurately within certain threads having a customized grouping of messages for each user, a system can reduce the number of times a user needs to interact with a computing device to obtain information. This can lead to the reduction of manual data entry that needs to be performed by a user. By reducing the need for manual entry or reducing the need for other inputs that are needed to navigate through a large number of message threads, inadvertent inputs and human error can be reduced. This can ultimately lead to more efficient use of computing resources such as memory usage, network usage, or processing resources, since duplicative inputs and corrective inputs will be reduced.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A is a block diagram of a system that can modify a user interface to enable a user common to multiple threads to readily view related messages from the multiple threads.

FIG. 1B illustrates an example of an interface that displays a discovered thread in a side-by-side format with an original thread.

FIG. 2A illustrates a first stage of a process for linking two or more threads.

FIG. 2C illustrates a third stage of a process for linking two or more threads.

FIG. 3A illustrates an example of a number of user interfaces displaying original threads, where the user interfaces provide user interface elements for linking other threads.

FIG. 3B illustrates an example of a user interface that displays a linked thread in a side-by-side format with an original thread.

DETAILED DESCRIPTION

Figure 2B:
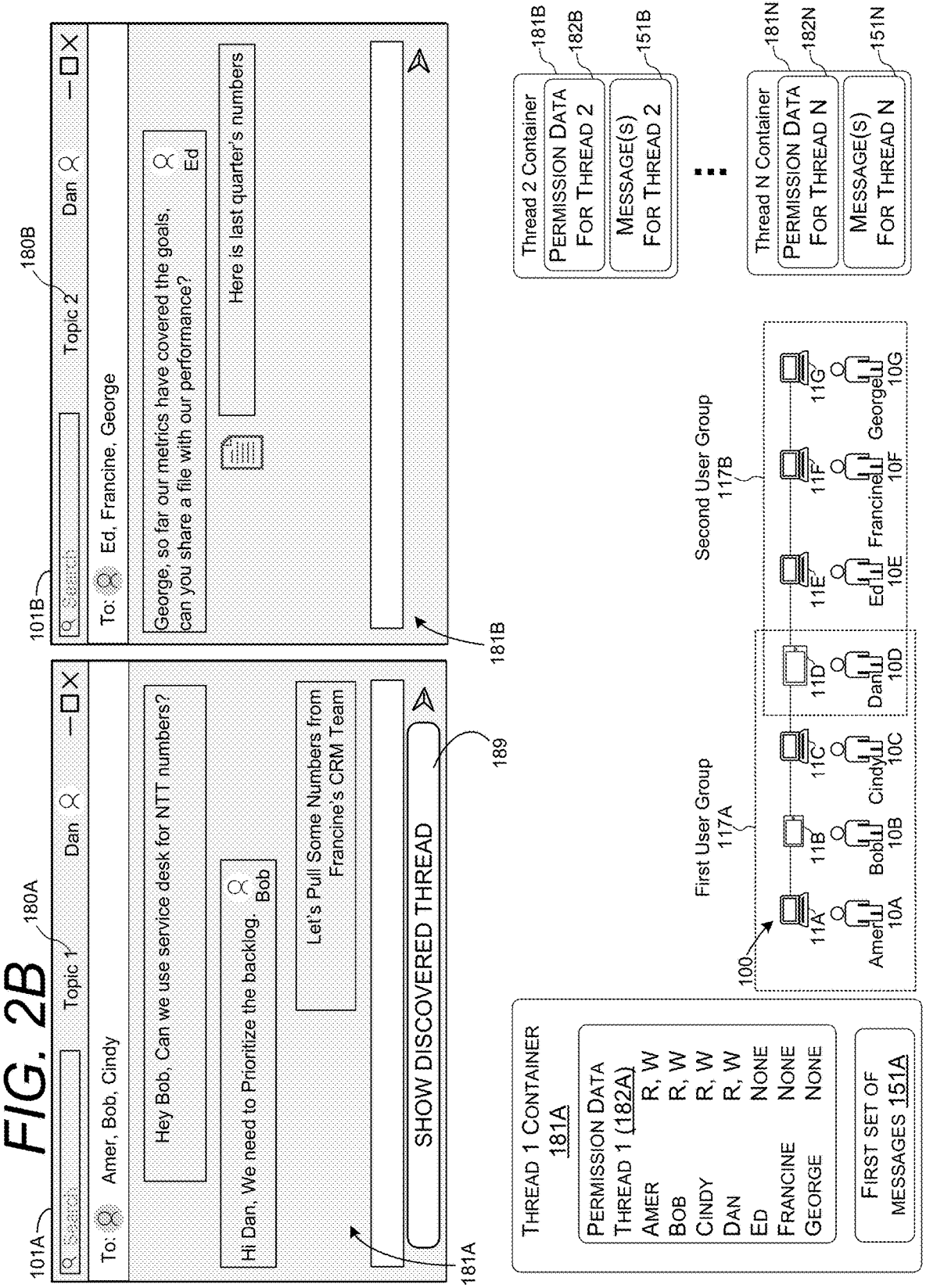
FIG. 2B illustrates a second stage of a process for linking two or more threads.

The techniques disclosed herein provide a system that can identify two or more independently managed message threads and modify a user interface to enable a user that is common to the threads to view related messages. For instance, if a user is participating in a first chat session that is displayed within a first message thread, the system can identify other message threads that are related to the first message thread. The search for the related message threads can be limited to message threads that the user is participating in. In some embodiments, the system will only search for and display message threads that have at least one common user to the first message thread. The related message threads can be displayed concurrently with the first thread. In some configurations, the related message threads can be displayed in a side-by-side user interface that is split to accommodate a display of the first thread and the related threads. The system can provide this display of two or more threads while linking the threads but not merging the messages of the threads. A data structure may be utilized to link the message threads to enable a system to automatically display the threads together when one of the threads is recalled. The linked message threads can also maintain and modify access permissions for the threads as they are discovered in the search queries and linked to one another.

The disclosed techniques address a number of technical problems and provide a number of technical effects. In for example, the techniques disclosed herein provide a number of enhanced security measures to restrict user access to certain clusters of data based on user memberships of message threads. The restriction of user access and the dynamic nature of also granting user access provides a higher level of security while allowing a system to accommodate a number of user scenarios where users need to dynamically grant and revoke permissions.

The techniques herein can also optimize interface displays of message threads for improving user interaction models and improving efficiencies with respect to computing resources. For example, by providing a display of threads that pertains to a thread that is already displayed, a computing device can effectively and more accurately display information in a format that can allow a more accurate level of control of how content is organized. This allows a system to display more accurate associations between messages that are stored in separate threads, while also allowing the system to maintain the separation of those threads. The techniques disclosed herein provide a number of other technical benefits that can reduce redundant requests for information that may be missed when messages are not organized in a user interface. Among other technical effects, the improved user interactions disclosed herein lead to more efficient use of computing resources such as memory usage, network usage, processing resources.

Referring now to FIG. 1, aspects of a system 100 are shown and described below. In this example, individual computing devices 11 are interconnected with a communication session configured for exchanging messages and managing permissions on a per user and per thread basis. Each user 10 is associated with a computing device 11 and each computing device 11 can display a user interface 101. In this example, a first user group 117A is associated with a first chat session comprising messages 151A displayed in a first thread 181A related to a first topic 180A. Also shown, a second user group 117B is associated with a second chat session comprising messages 151B displayed in a second thread 181B related to a second topic 180B. The first user group 117A includes the first four users, the first user 10A through the fourth user 10D, and the second user group 117B includes the last four users, the fourth user 10D through the seventh user 10G. The fourth user 10D, is common to both threads.

One or more computing devices of the system can store a container for each thread 181. For instance, a first container for the first thread 181A and store permissions for individual users of the system. In this example, the first four users can read and write to the messages 151A of the first thread while the last three users are restricted from reading or writing messages to the first thread. Each container can also store data that identify the messages for the first thread 181A. In this example, the first user is participating in N number of chat sessions. Thus, the system has configured and maintains a thread container 181 each thread up to the Nth thread container 181N.

In this example, a first user interface 101A is displayed on a screen of a fourth computing device 11D for the fourth user 10D. The first user interface 101A displays messages 151 pertaining to the first topic 180A of the first thread 181A. A second user interface 101B is also displayed on a screen of the fourth computing device 11D for the fourth user 10D. The second user interface 101B displays a second set of messages 151B pertaining to the second topic 180B of the second thread 181B. The second thread 181B comprises a second set of messages 151B associated with a second user group 117B, wherein the user 10D is a common member of the first user group 117A and the second user group 117B. Also shown, the threads can also display other graphical elements 152 configured to allow access to attached files.

To illustrate aspects of the present disclosure, consider a situation where the fourth user 10D, Dan, is viewing the first user interface 101A. In this example, the fourth user may be simultaneously viewing, or not viewing, the second user interface in addition to many other user interfaces displaying the other threads, e.g., up to N threads. In this scenario, the fourth user may be viewing a number of threads, only viewing the first thread in the first user interface 101A or have each user interface in a minimized or close date while maintaining a connection with each thread.

In some embodiments, as shown in FIG. 1A, the fourth computer 11D can display the first user interface 101A comprising messages of the first thread for a first group of users. The fourth computer 11D is associated with the fourth user 10D, Dan, who is a common user for the threads, the first thread 181A to the Nth thread 181N. In such embodiments, the system 100, which can include a server, can receive communication data comprising a first thread 181A having a first set of messages 151A associated with a first user group 117A, wherein the messages 151A of the first thread 181A are displayed on a user interface 101A rendered on a client computing device 11D of a user 10D.

While participating in the chat session of the first thread, the system can search for threads that are related to the first thread and present them to the user. As described in more detail below, the system can also update the linking data structure 184 to link the first thread 181A to any related threads, such as the second thread 181B. As described in more detail below, this allows the system to readily display any related threads when the user accesses one of the related threads.

The discovery of related threads can be invoked by an automated process or a process that is invoked by a user input. In the automated embodiments, the system may analyze the messages 151A of the first thread 181A to determine if select messages of the first message thread are related to messages of other threads. For instance, in this example, the last message of the first thread indicates the name of a participant of the second thread. In such scenarios, the system may identify the second thread related thread and display a graphical indicator 189 indicating the existence of a related thread. In response to the user selecting the graphical indicator 189, or in response to the identification of the related thread, the system may transition user interface 101A to an updated version of the first user interface 101A' shown in FIG. 1B. The updated user interface 101A' of FIG. 1B is configured to display the first thread and the related threads, which in this case is the second thread. In an alternative embodiment, the system can display the graphical element 189, which can cause the system to search for related threads. Once they related threads are discovered, the system can transition to the updated user interface 101A' shown in FIG. 1B.

The system can limit the input to be received only from the user 10D that has permissions to read and write messages with the first thread 181A and the second thread 181B. In addition, the system can limit the analysis of related threads only to the threads that have at least one common user with the first thread, e.g., a displayed thread.

The system can receive an indication identifying a second thread 181B from a plurality of threads 181B-181N each associated with individual user groups 117. In some embodiments, the indication is provided by receiving a user input at a graphical element 189. In another embodiment, the indication can be an event, such as the system identifying one or more threads that are related to the first thread. The discovery of related threads can be performed using a number of suitable searching methods. For instance, keywords of the first thread can be used for search queries within other threads. If any of the other threads, such as the second thread, contain messages meeting one or more criteria, those threads can be registered within a data structure as a related thread.

To improve the efficiency of the computing system, the system may only build search queries using keywords from select messages of an active thread, e.g., the first thread being displayed to a user. Thus, the system may only use keywords from select messages to perform a search for related threads. By limiting the number of messages that are used for analysis to detect related threads, a system may introduce further efficiencies with respect to computing resources. In one example, the system may only select messages having multiple sentences or multiple phrases. In such an example, any message having more than one sentence can be selected for analysis. In another example, the system may select messages that have more than a threshold number of words or characters. In such an example, only messages having more than a threshold number of words or threshold number of characters can be selected for analysis.

In other examples, a system may select a message for analysis based on the position of the message within a user interface. This may include a position of a message within a thread or a viewing area, e.g., the last message of a thread or a message that is at the top of a viewing area, may only be selected for analysis. In yet another example, a system may select a message for analysis based on a timestamp or a state associated with the message. In such an example, a most recently received message may be selected for analysis, or a system may only select a message that is recently composed but not sent, etc. In other examples, a system may only select messages that have been received within a predetermined time period, or a system may only select message that have been received outside of a predetermined time period. In one illustrative example, the system may only select the most recently received messages, e.g., up to the last 100 messages.

Other characteristics of a message, such as a format, can be used to select a message for analysis. This may include a font type, a threshold number of capital letters, threshold number of capital letters per word, or formatting combinations, e.g., a threshold number of characters in bold text, etc. Once a message is selected for analysis, the system determines if the message contains multiple topics. These examples are provided for illustrative purposes and are not to be construed as limiting. The system can utilize any property, condition, state or any combination of factors described herein to determine if a message is to be selected for analysis. The system can also select certain messages for analysis based on the identification of certain categories of words, e.g., the name of the name of certain individuals, team members, team names, product names, company names, etc.

In addition to identifying select messages for building search queries, the system may only use predetermined words of the select messages to build queries. The predetermined words can be categories of words like team names, product names, etc. The predetermined words can also involve usernames or specified usernames such as a person that was mentioned within a message. In the example shown in FIG. 1A, the most recent message of the thread includes the name of a person that is a participant in the second thread. The identification of a person that is a participant in other the threads can cause the system to select that message for building a query using other words in that message. Alternatively, the system may identify any of the other threads having a common user as a related thread if a participant in the other thread is named in the first thread.

As shown in FIG. 1B, a data structure 184 is updated in response to the identification of the second thread. In some configurations, the data structure 184 is updated in response to the identification of the second thread as a related thread. In other configurations, the data structure 184 is updated in response to the identification of the second thread in an input or any other type of event. The data structure defines the link between the threads so when one of the threads is later selected for display, the other thread is displayed, or the user is given the option to display that linked thread. In some configurations, responsive to the identification of the second thread 181B from the plurality of threads 181B-181N, causing an update to a data structure 184 to maintain a link relationship between the first thread 181A and the second thread 181B, wherein the link relationship is configured to control a display of the first thread 181A and the second thread 181B. Thus, at a later time, e.g., as described below, when the user 10D displays the first thread 181A, the system either suggests a display of the second thread 181B or automatically displays the second thread 181B.

Also, shown in FIG. 1B, the messages of the first thread and the second thread are concurrently displayed together. This display is performed without merging the data containers for each thread. As shown, the containers of each thread that are concurrently displayed are maintained separately with separate user rights. In this example, the first thread container defines permissions for the first user group, and the second thread container defines permissions for the second user group. Each thread container can also include references or copies of the messages that correspond to each thread, e.g., the first set of messages 151A and the second set of messages 151B. The linking data structure 184 can comprise a first identifier for the first thread and a second identifier for the second thread. The link can be in the form of a pointer, an address, or any other data object that can draw an association between threads that are identified as related threads. For illustrative purposes, the term "related threads" can refer to threads that have been identified by an input, or the term related threads can refer to threads that have content that is contextually related.

In response to identifying related threads, in some embodiments, the system can maintain the permissions of each user and only show the related threads for users that are common to both threads. Thus, in this example, users that are common to the first thread and the second thread have permissions to read and write to both threads. The first user group can only still read and write to the first thread but are restricted from reading of the second thread or writing messages to the second thread. The second user group can only still read and write to the second thread but are restricted from reading of the first thread or writing messages to the first thread. In other embodiments, in response to identifying a related thread, the system can modify the permissions of the related thread, e.g., the second thread, to allow users of the first thread to read, but not write, messages of the second thread. This modification can be for a predetermined period of time or during a time in which a designated user, such as the fourth user, permits. The designated user can provide one or more inputs or input criteria indicating a timeline or criteria for allowing the first group of users to read messages of the second thread.

As shown in FIG. 1B, in response to the identification of the second thread as being a related thread, the system can cause the client computing device 11D of the user 10D to concurrently display the second set of messages 151B of the second thread 181B with the first set of messages 151A of the first thread 181A. This transition of the user interface can occur while the system maintains storage of the first set of messages 151A of the first thread 181A in a first container 182A separate from storage of the second set of messages 151B of the second thread 181B in a second container 182B.

Alternatively, in response to the identification of the second thread as being a related thread, the system can cause the client computing device 11D of the user 10D to display a control with the first set of messages 151A, which, when activated, causes display of the second set of messages 151B. An example of this embodiment is shown in FIGS. 2A-2C.

FIG. 2A shows a first stage of a process for identifying a related thread. In this figure, the first user interface 101A displays an input control element 188 which when activated by the user causes the system to identify a related thread. For instance, in response to user input at the control element 188 the system can build a query from one of our select messages of the first thread 181A and identify a related thread, such as the second thread.

FIG. 2B shows a resulting user interface once the related thread is identified. In this example, the user interface displays a modified control element 189 that indicates that a related thread has been discovered. In response to a user input at the modified control element 189, the system causes a display of an updated user interface 101A' shown in FIG. 2C. In this example, the permission data is also updated to allow the first user group 117A to view the messages of the second thread. These transitions can occur while the system maintains storage of the first set of messages 151A of the first thread 181A in a first container 182A separate from storage of the second set of messages 151B of the second thread 181B in a second container 182B.

Also shown in FIG. 2C, the updated user interface can also comprise an input element, e.g., the "UNLINK" button, to allow the user to modify the data structure to unlink the threads. In response to a user input at this element, the system can modify the data structure to unlink the threads. This causes the system to allow each thread to be viewed independently without causing the system to recommend the display of a related thread.

FIG. 3A and FIG. 3B show an embodiment where a user input can indicate a related thread. FIG. 3A shows a number of user interfaces each showing messages of individual threads. The first user interface 101A shows the messages of the first thread, the second user interface 101B shows messages of the second thread, the third user interface 101C shows messages of the third thread, and the fourth user interface 101D shows messages of or thread. Each user interface can provide one or more interface elements 221 that identify other threads user, the fourth user 10D, is participating in. Thus, the user interface input elements 221 only display identifiers of threads that the viewer has permissions to access, e.g., the user is a common member to the threads that are displayed as link options.

For example, in the first user interface, the first input element 221A is configured to allow the user to select the second thread is as a related thread, the second input element 221B is configured to allow the user to select the third thread as a related thread, and the fourth input element 221D is configured to allow the user to select the fourth thread as a related thread. The other user interfaces display similar input elements 221 allowing the user to link while viewing the other threads.

For illustrative purposes, consider a scenario where the user selects the first input element 221A. In response to this indication, the system can provide an updated user interface 101A' as shown in FIG. 3B. The updated user interface can display the first thread concurrently with the display of the second thread. In addition, the permissions and the linking data structure can be updated as described herein.

Figure 4A:
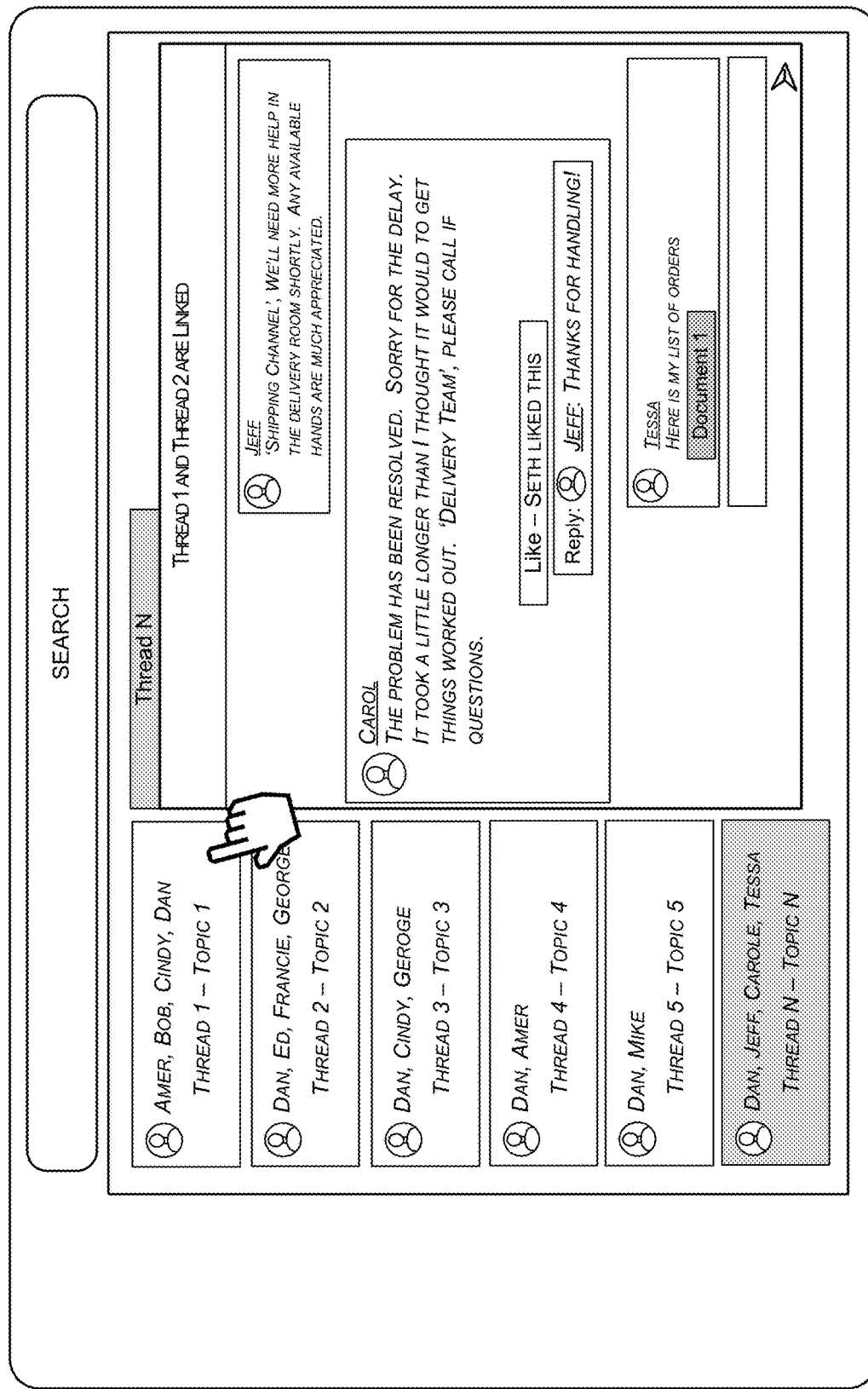
FIG. 4A illustrates a first stage of an automated process for displaying two or more linked threads.
Figure 4B:
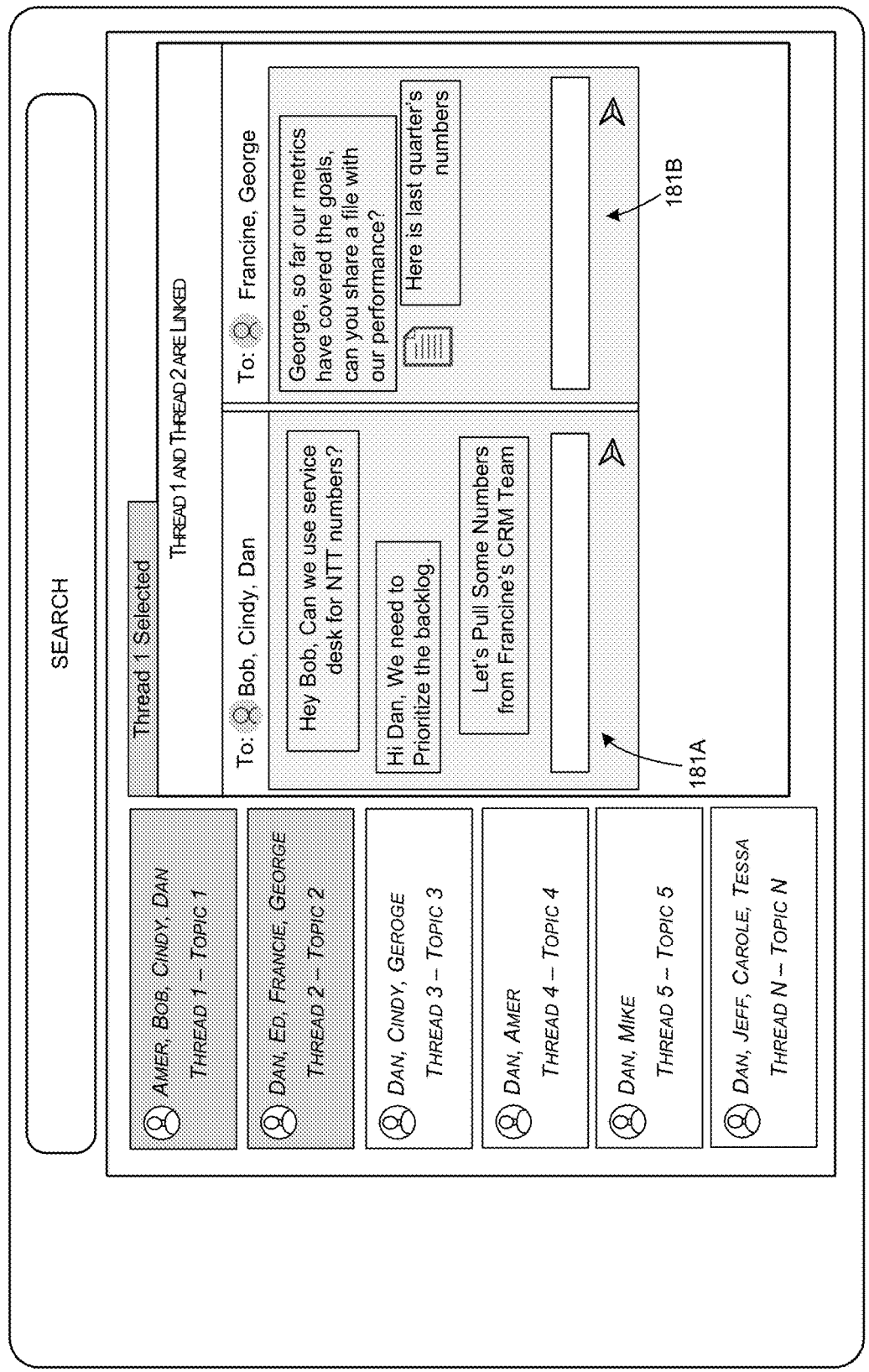
FIG. 4B illustrates a second stage of an automated process for displaying two or more linked threads.

As described above, the system can utilize the linking data structure to establish relationships between various threads that control the display of each thread. Thus, once to threads are linked, the system can automatically display a related thread upon activation or display of one of the related threads. In the example shown in FIGS. 4A and 4B, a user input selecting the first thread for display causes the system to access the linking data structure, which in turn causes the system to display all related threads. In FIG. 4A, the user provides an input indicating a selection of the first thread display. In response, the system accesses the linking data structure and identifies the second thread is linked to the first thread. Then as shown in FIG. 4B, the system causes the display of the first thread and the second thread, which is based on an input only selecting the first thread. This example is provided for illustrative purposes and is not to be construed as limiting. It can be appreciated that the input can be provided gesture, voice command, or any other suitable input identifying a specific thread that is selected for display.

Figure 5A:
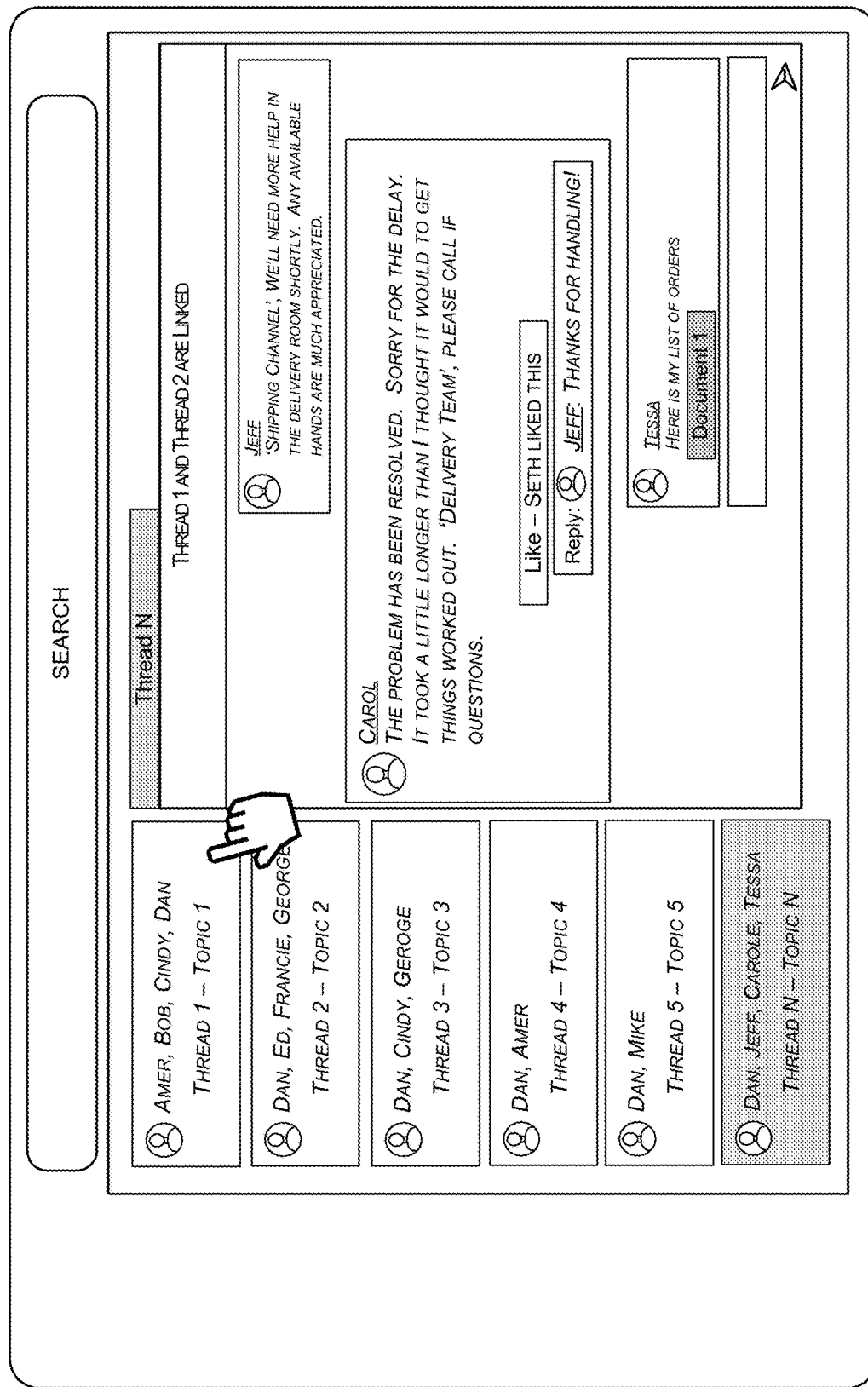
FIG. 5A illustrates a first stage of an interactive process for displaying two or more linked threads.
Figure 5B:
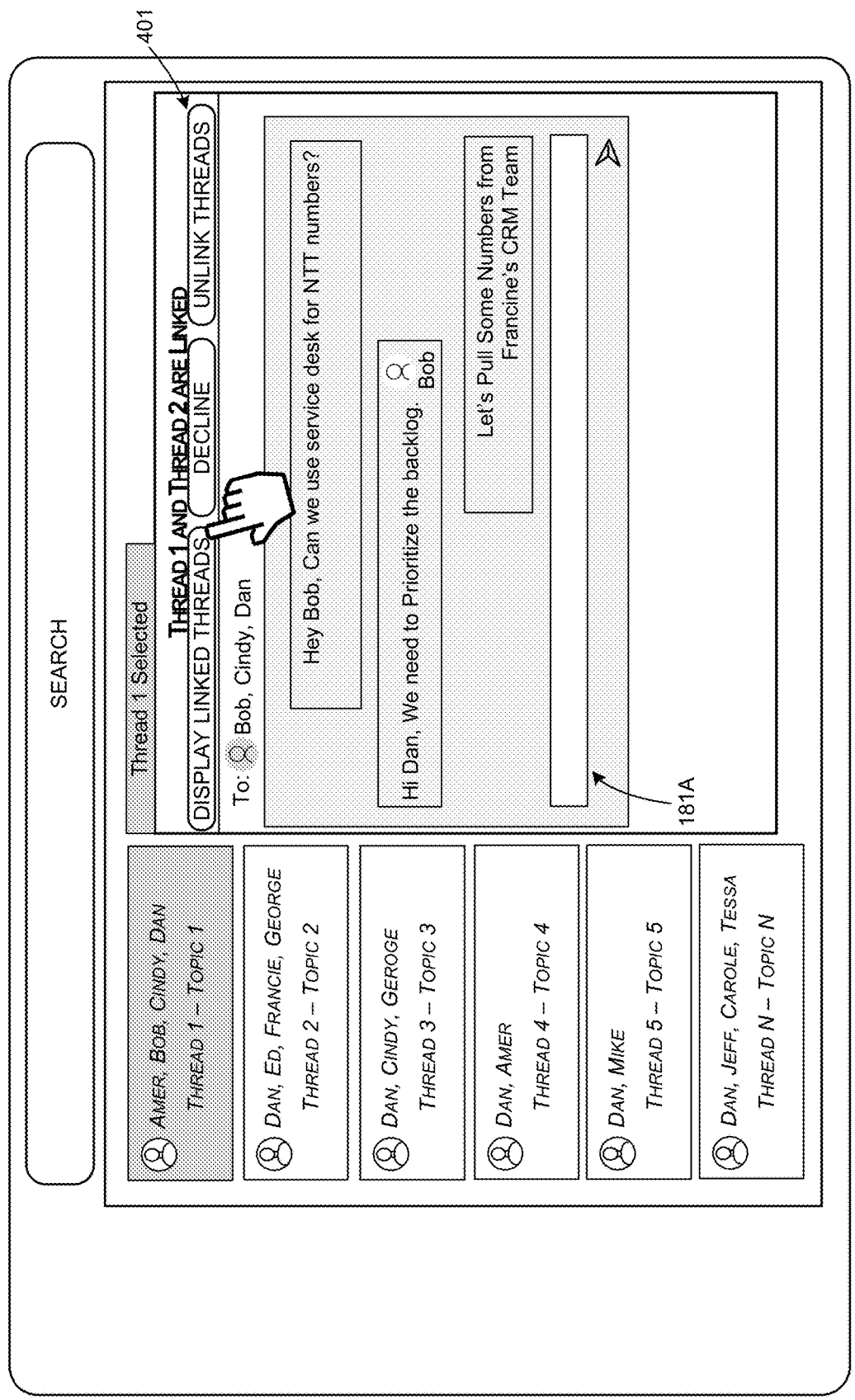
FIG. 5B illustrates a second stage of an interactive process for displaying two or more linked threads.
Figure 5C:
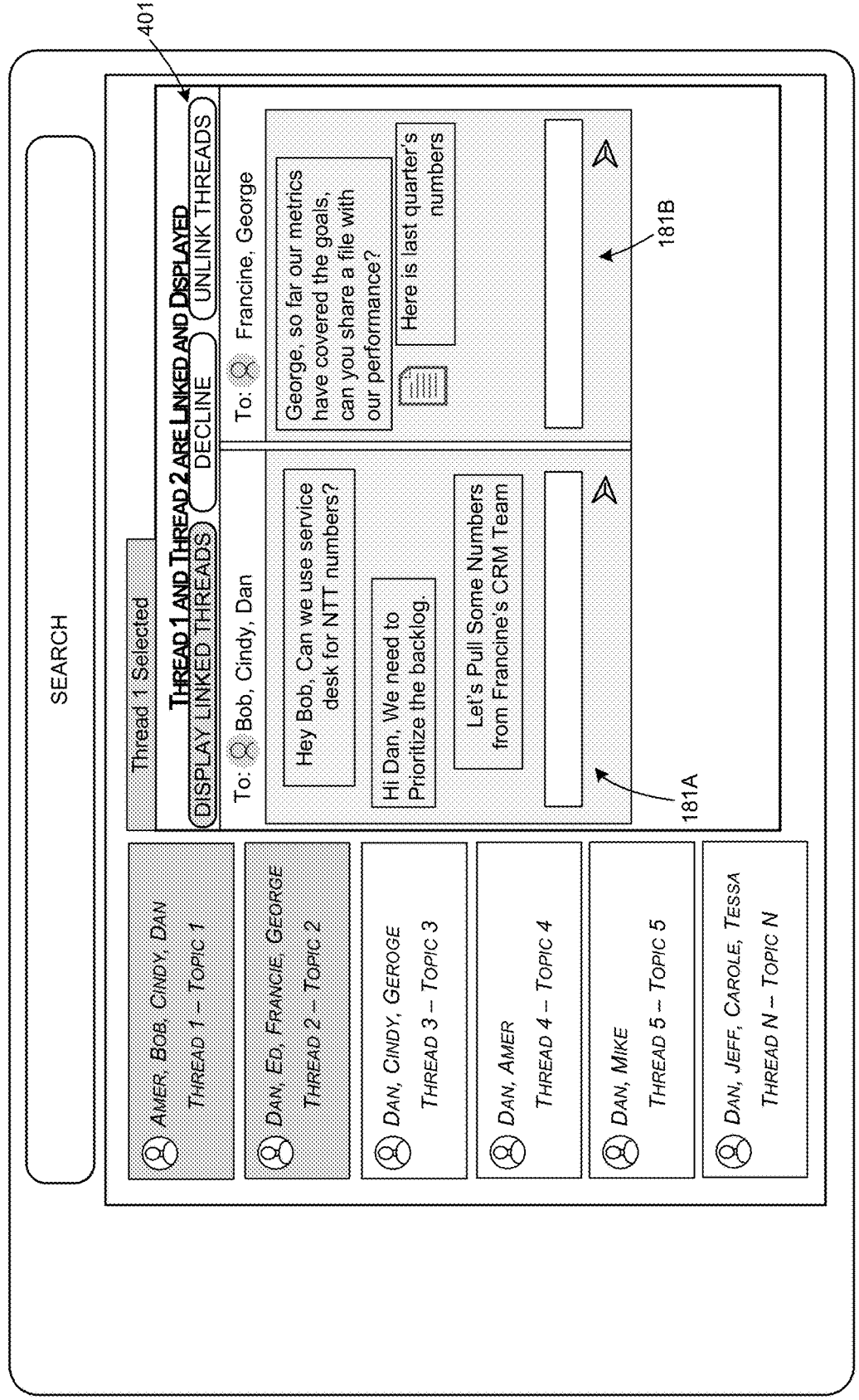
FIG. 5C illustrates a third stage of an interactive process for displaying two or more linked threads.

FIGS. 5A-5C illustrate another example where a related thread is identified key data structure. In response to the identification of a related thread, the system can display a recommendation to display a related thread. Similar to the example above, in FIG. 5A, the user provides an input that identifies a thread to be displayed. In this example, the user provides an input indicating a selection of the first thread for display. In response to the input, the system analyzes the linking data structure. For illustrative purposes, in this example, the linking data structure indicates that the first thread and the second thread are linked. In response to identifying the linked threads, the system can display text identifying the linked threads. The system can also cause the display of more input elements 401 giving the user an option to display the related threads, declined the display of the related threads, or unlink the related threads. In response to the first option, the system can transition the user interface to an updated user interface shown in FIG. 5C, where the related threads are concurrently displayed. At any time, the user can provide an input to decline the display of the linked threads, in which case the system would transition the display back to the original user interface 101A shown in FIG. 5B. The user can also provide an input to unlink the related threads. In response to this input, the system can modify the linking data structure to remove the link between the related threads.

Figure 6:
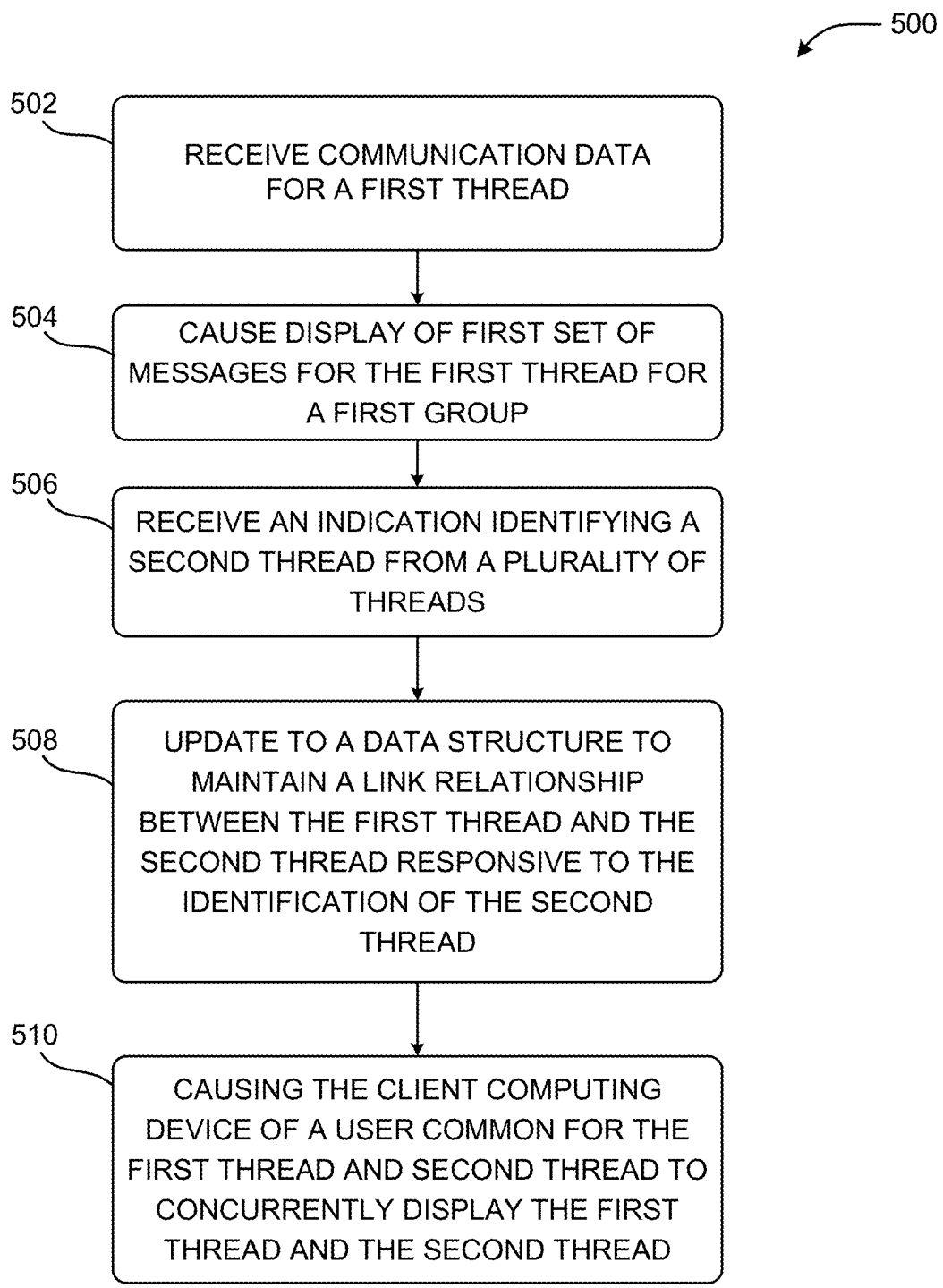
FIG. 6 is a flow diagram showing aspects of a routine for discovering, controlling, and displaying related message threads.

FIG. 6 is a diagram illustrating aspects of a routine 500 for enabling users to split message threads into child message threads and manage thread formats between a number of devices. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 6 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 502 where the system can receive communication data comprising a first thread 181A having a first set of messages 151A associated with a first user group 117A. The communication data can include messages and a thread container which can define parameters in which a thread is displayed. The thread container can also comprise permission data defining user identities and associated permissions for each identity.

At operation 504, the messages 151A of the first thread 181A can be displayed on a user interface 101A rendered on a client computing device 11D of a user 10D. FIG. 1A shows an example of a user interface having a first thread for a first group of users. The user interface is displayed to a user, the fourth user, Dan, who is common to multiple threads including the second thread that is identified as a related thread.

At operation 506, the system can receive an indication identifying a second thread 181B from a plurality of threads 181B-181N each associated with individual user groups 117. The indication can be a user input identifying the second thread. Alternatively, the indication can be the result of a search threads based on a query. The query can be built from keywords or other content shared within messages of the first thread. The keywords or other content can originate from select messages of the first thread, where the select messages can be determined based on one or more criteria disclosed herein.

In some configurations, the indication is provided by a user 10D that has permissions to read and write messages with the first thread 181A and the second thread 181B, wherein the indication is provided by receiving a user input at a graphical element 189, wherein the second thread 181B comprises a second set of messages 151B associated with a second user group 117B, wherein the user 10D is a common member of the first user group 117A and the second user group 117B. The search for related threads can be limited to threads that only has a common user with the first thread. For instance, a plurality of threads may be searched only if the plurality of threads have a common user with the first thread, e.g., Dan is a participant in each of the plurality of threads.

At operation 508, the system can update a data structure 184 to maintain a link relationship between the first thread 181A and the second thread 181B. The link relationship is configured to control a display of the first thread 181A and the second thread 181B. In some configurations, operation 508 can be responsive to the identification of the second thread 181B from the plurality of threads 181B-181N. For example, as shown in FIG. 1B, a data structure is updated in response to the selection of the second thread. The data structure defines the "link" between the threads so when one of the threads is later selected for display, the other thread is displayed, or the user is given the option to display that linked thread.

At operation 510, the system can cause a client computing device 11D of the user 10D to concurrently display the second set of messages 151B of the second thread 181B with the first set of messages 151A of the first thread 181A. Alternatively, operation 510 can cause a display of a control with the first set of messages 151A, which, when activated, causes display of the second set of messages 151B. These operations can be performed maintaining storage of the first set of messages 151A of the first thread 181A in a first container 182A separate from storage of the second set of messages 151B of the second thread 181B in a second container 182B.

In some configurations, one or more operations of the routine can also include receiving a selection of the first thread for display of at least a portion of the first set of messages. In response to receiving a selection of the first thread for display of at least a portion of the first set of messages, analyzing the data structure to verify the link relationship between the first thread and the second thread. Then, in response to verifying the link relationship between the first thread and the second thread, the system can automatically cause a display of one or more messages of the second thread concurrently with the display of the at least a portion of the first set of messages. This involves a scenario of an automatic display of a linked thread. Thus, after the linking is established, when the user opens one of the threads, e.g., the first thread, the data structure causes a computer to automatically open the linked, e.g., related threads, the second thread.

In some configurations, one or more operations of the routine can also include receiving a selection of the first thread for display of at least a portion of the first set of messages. In response to receiving a selection of the first thread for display of at least a portion of the first set of messages, the system can analyze the data structure to verify the link relationship between the first thread and the second thread. Then, in response to verifying the link relationship between the first thread and the second thread, the system can cause a display of a notification identifying the second thread as having a link relationship to the first thread. In response to the notification identifying the second thread as having a link relationship to the first thread, causing a display of a user interface element for receiving a user input configured to cause a display of one or more messages of the second thread concurrently with the display of the first set of messages of the first thread.

These operations can provide a notification of a linked thread, which allows a system to display options for a user to display the related thread. This can occur after the link is established. For example, when a user opens one of the threads, e.g., Thread 1, the data structure causes a computer to display a notice of the linked threads, a related thread, such as Thread 2. The system enables the user to initiate the display of the linked threads by providing an input. The display of the graphical element is optional. For example, the notification can be communicated by a voice command and the user can provide any suitable gesture for causing the display of the related thread.

In some configurations, one or more operations of the routine can also include receiving a selection of the first thread for display of at least a portion of the first set of messages. In response to receiving a selection of the first thread for display of at least a portion of the first set of messages, analyzing the data structure to verify the link relationship between the first thread and the second thread. In response to verifying the link relationship between the first thread and the second thread, causing a display of a notification identifying the second thread as having a link relationship to the first thread. In response to the notification identifying the second thread as having a link relationship to the first thread, displaying a user interface element for receiving a user input causing an update to the data structure to cancel the link relationship between the first thread and the second thread. These operations allow the user to unlink the related thread. A notification of the linked thread is provided when the user opens one of the threads, e.g., Thread 1. The data structure causes the system to display a notice of the linked threads, e.g., Thread 2. An input from the user can cause the system to unlink the second thread from the first thread.

In some configurations, one or more operations of the routine can also include analyzing one or more messages 151 of the plurality of threads 181B-181N to determine that a second topic 180B of the second thread 182B has a threshold level of relevancy to the first topic 180A of the first thread 182A. The analysis of the one or more messages 151 of the plurality of threads 181B-181N is limited to threads having at least one common user with the first user group of the first thread. The system can also select the second thread 181B in response to determining that the second topic 180B of the second thread 182B has the threshold level of relevancy to the first topic 180A of the first thread 182A. This can enable the automatic identification of related threads based on an analysis of a set of threads that have a common user. This can conserve computing resources by limiting the analysis of the threads to the threads that has a common user to the first thread.

In some configurations, in one or more operations of the routine, the indication identifying the second thread is generated by receiving a user input at the client computing device of the user, wherein the user input identifies the second thread as a selected thread to be concurrently displayed with the first thread. This can cause a linking of a thread, e.g., the second thread, thereby making the second thread a related thread without the need for analysis of the messages. Also, in the one or more operations of the routine, permission data 182A for the first thread 181A may be configured to only allow a first user group 117A to view and write to the messages 151A of the first thread 181A. The permission data 182B for the second thread 181B can also be configured to only allow a second user group 117B to view and write to the messages 151B of the second thread 181B. The permission data 117B can then be modified to allow the one or more computers of the first set of users to display the messages of the second thread while restricting the one or more computers of the first set of users to edit the messages of the second thread or restricting the one or more computers of the first set of users to add new messages to the second thread.

In some configurations, one or more operations of the routine can also include operations for maintaining separate containers for linked threads. Thus, as new messages are received for each thread, the data is written to separate containers so each thread can be unlinked at any time. Thus, the following operations can be added to one or more operations of the routine. This can include causing an update to the first container to store the first additional message within the first container, in response to receiving a first additional message directed to the first user group. Then causing a display of the first additional message to be displayed within an arrangement of the first set of messages of the first thread. The system can then an update to the second container to store the second additional message within the second container in response to receiving a second additional message directed to the second user group. This can allow the system to display the second additional message to be displayed within an arrangement of the second set of messages of the second thread, and concurrently display the second additional message with the first additional message, while allowing the threads to be stored separately. This allows the user to unlink the threads at a later time and preserve security and the autonomous functions of each thread.

Figure 7:
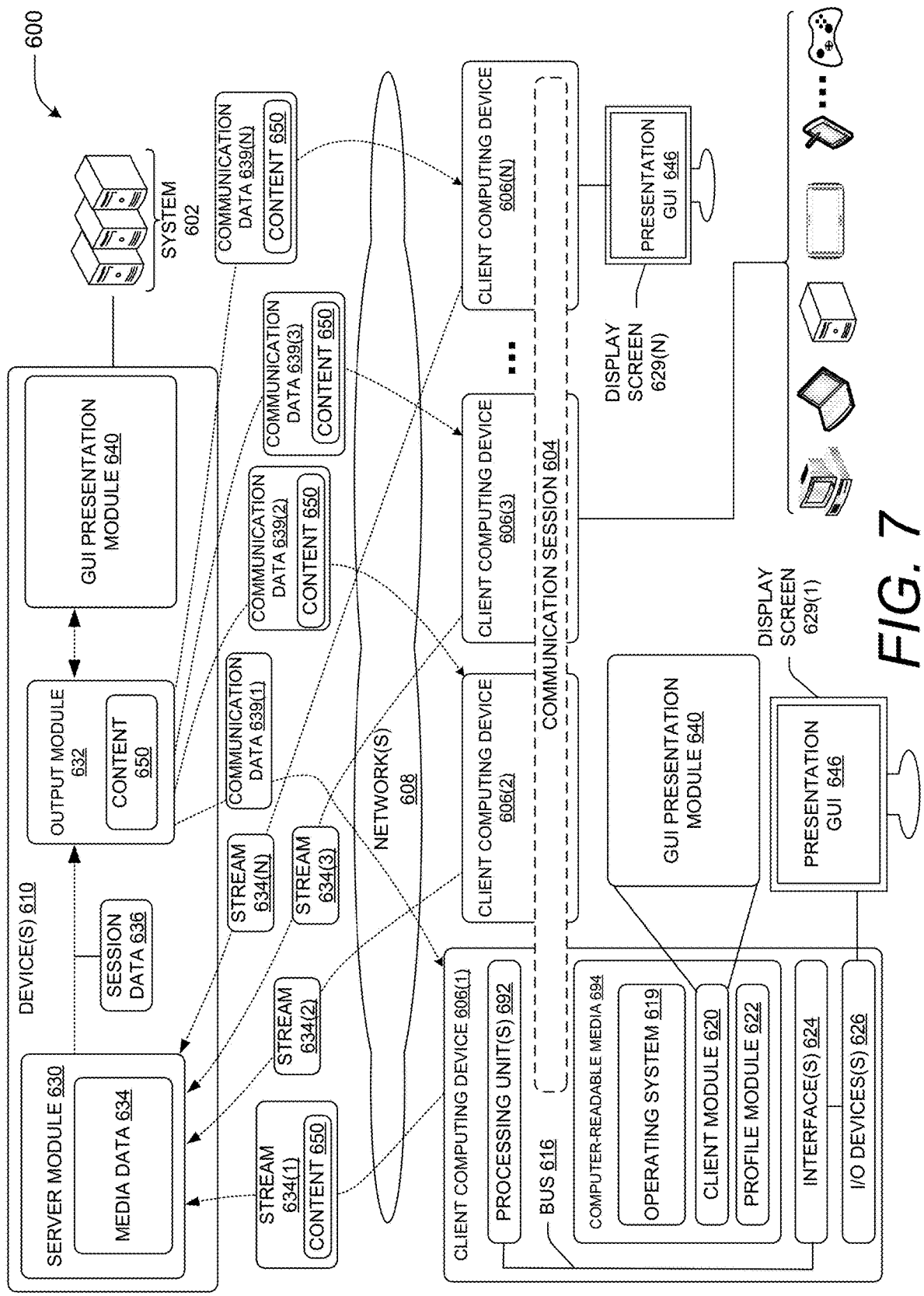
FIG. 7 is a computing system diagram showing aspects of an illustrative operating environment for the techniques disclosed herein.

FIG. 7 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 7 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 7, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 7) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 8:
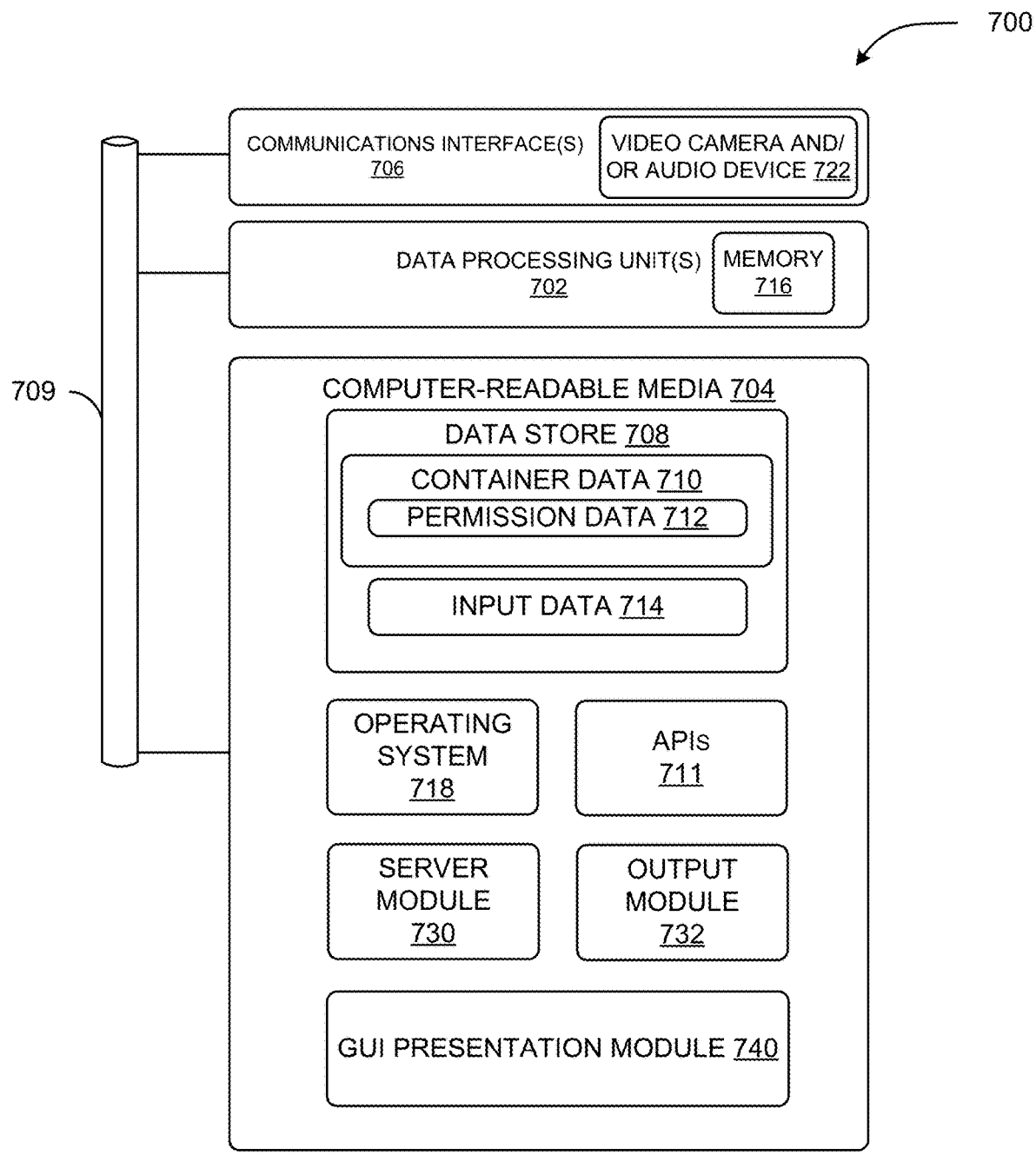
FIG. 8 is a computing architecture diagram showing aspects of the configuration and operation of a computing device that can implement aspects of the techniques disclosed herein.

FIG. 8 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. The device 700 may represent one of any of the devices disclosed herein, e.g., device 606 of FIG. 7, device 11 of FIG. 1, or a server 602 of FIG. 7.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se. In one example, the computer storage media can be block 704 in FIG. 8 or block 694 in FIG. 7.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704, which can also be storage media, includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 7), thread container data 710, which is referred to herein as a thread container, permission data 712 (e.g., the data structures shown in FIGS. 1A, 1B, 2A and 2B), and/or other data such as input data 714, which can include voice commands, a mouse input, a touch input or other definitions of input gestures. The session data can include a total number of participants (e.g., users and/or client computing devices) in a communication session, activity that occurs in the communication session, a list of invitees to the communication session, and/or other data related to when and how the communication session is conducted or hosted. The data store 708 may also include contextual data, such as the content that includes video, audio, or other content for rendering and display on one or more of the display screens 629. Hardware data can define aspects of any device, such as a number of display screens of a computer. APIs 711 can also be provided to allow the client computers to communicate with the server. The contextual data can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described using language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for identifying and displaying related message threads of a communication system, the method comprising:

receiving communication data comprising a first thread having a first set of messages associated with a first user group;

receiving an indication identifying a second thread from a plurality of threads each associated with individual user groups, wherein the indication is provided by a user that has permissions to read and write messages with the first thread and the second thread, wherein the indication is provided by receiving a user input at a graphical element, wherein the second thread comprises a second set of messages associated with a second user group, wherein the user is a common member of the first user group and the second user group;

responsive to the identification of the second thread from the plurality of threads, causing an update to a data structure to maintain a link relationship between the first thread and the second thread, wherein the link relationship is configured to control a display of the first thread and the second thread;

receiving a selection of the first thread for display of at least a portion of the first set of messages;

in response to receiving a selection of the first thread for display of at least a portion of the first set of messages, analyzing the data structure to verify the link relationship between the first thread and the second thread; and in response to verifying the link relationship between the first thread and the second thread, causing a client computing device of the user to concurrently display one or more messages of the second set of messages of the second thread with at least a portion of the first set of messages of the first thread.

2. The method of claim 1, further comprising:

in response to verifying the link relationship between the first thread and the second thread, causing a display of a notification identifying the second thread as having the link relationship to the first thread.

3. The method of claim 1, further comprising:

in response to verifying the link relationship between the first thread and the second thread, causing a display of a notification identifying the second thread as having the link relationship to the first thread; and in response to the notification identifying the second thread as having the link relationship to the first thread, causing a display of a user interface element for receiving a second user input configured to cause an update to the data structure to cancel the link relationship between the first thread and the second thread.

4. The method of claim 1, wherein the indication identifying the second thread is generated by a method comprising:

analyzing one or more messages of the plurality of threads to determine that a second topic of the second thread has a threshold level of relevancy to the first topic of the first thread, wherein the analysis of the one or more messages of the plurality of threads is limited to threads having at least one common user with the first user group of the first thread; and selecting the second thread in response to determining that the second topic of the second thread has the threshold level of relevancy to the first topic of the first thread.

5. The method of claim 1, wherein the indication identifying the second thread is generated by receiving a second user input at the client computing device of the user, wherein the second user input identifies the second thread as a selected thread to be concurrently displayed with the first thread.

6. The method of claim 1, wherein permission data for the first thread only allows a first user group to view and write to the messages of the first thread, wherein permission data for the second thread only allows a second user group to view and write to the messages of the second thread, wherein the permission data is modified in response to the identification of the second thread from the plurality of threads to allow the one or more computers of the first user group to display the messages of the second thread while restricting the one or more computers of the first user group to edit the messages of the second thread or restricting the one or more computers of the first user group to add new messages to the second thread.

7. The method of claim 1, further comprising:
in response to receiving a first additional message directed to the first user group, causing an update to the first container to store the first additional message within the first container;
causing a display of the first additional message to be displayed within an arrangement of the first set of messages of the first thread;
in response to receiving a second additional message directed to the second user group, causing an update to the second container to store the second additional message within the second container; and
causing a display of the second additional message to be displayed within an arrangement of the second set of messages of the second thread, wherein the second additional message is concurrently displayed with the first additional message.

8. The method of claim 1, wherein the client computing device of the user concurrently displays the second set of messages of the second thread with at least a portion of the first set of messages of the first thread while maintaining storage of the first set of messages of the first thread in a first container separate from storage of the second set of messages of the second thread in a second container.

9. The method of claim 1, wherein causing the client computing device of the user to concurrently display the one or more messages of the second set of messages of the second thread with at least the portion of the first set of messages of the first thread, comprises:
causing a display of a control element with the first set of messages prior to the display of the second set of messages;
receiving a selection of the control element for causing the display of the second set of messages; and
in response to the selection of the control element, causing the client computing device of the user to concurrently display the one or more messages of the second set of messages of the second thread with at least the portion of the first set of messages of the first thread.

10. A computing device for coordinating customized message threads for a plurality of users, comprising:
one or more processing units; and
a computer-readable storage medium having encoded thereon computer-executable instructions to cause the one or more processing units to:
receive communication data comprising a first thread having a first set of messages associated with a first user group, wherein the first set of messages of the first thread are displayed on a user interface rendered on a client computing device of a user;
receiving an indication identifying a second thread from a plurality of threads each associated with individual user groups, wherein the indication is provided by a user that has permissions to read and write messages with the first thread and the second thread, wherein the indication is provided by receiving a user input at a graphical element, wherein the second thread comprises a second set of messages associated with a second user group, wherein the user is a common member of the first user group and the second user group;
responsive to the identification of the second thread from the plurality of threads, cause an update to a data structure to maintain a link relationship between the first thread and the second thread, wherein the link relationship is configured to control a display of the first thread and the second thread;
receive a selection of the first thread for display of at least a portion of the first set of messages;
in response to receiving a selection of the first thread for display of at least a portion of the first set of messages, analyze the data structure to verify the link relationship between the first thread and the second thread; and
in response to verifying the link relationship between the first thread and the second thread, cause the client computing device of the user to concurrently display one or more messages of the second set of messages of the second thread with at least a portion of the first set of messages of the first thread, while maintaining storage of the first set of messages of the first thread in a first container separate from storage of the second set of messages of the second thread in a second container.

11. The computing device of claim 10, wherein the instructions further cause the one or more processing units to:
in response to verifying the link relationship between the first thread and the second thread, cause a display of a notification identifying the second thread as having the link relationship to the first thread.

12. The computing device of claim 10, wherein the instructions further cause the one or more processing units to:
in response to verifying the link relationship between the first thread and the second thread, cause a display of a notification identifying the second thread as having the link relationship to the first thread; and
receive a second user input causing an update to the data structure to cancel the link relationship between the first thread and the second thread.

13. The computing device of claim 10, wherein the indication identifying the second thread is generated by a method comprising:
analyzing one or more messages of the plurality of threads to determine that a second topic of the second thread has a threshold level of relevancy to the first topic of the first thread, wherein the analysis of the one or more messages of the plurality of threads is limited to threads having at least one common user with the first user group of the first thread; and
selecting the second thread in response to determining that the second topic of the second thread has the threshold level of relevancy to the first topic of the first thread.

14. The computing device of claim 10, wherein the indication identifying the second thread is generated by receiving a second user input at the client computing device of the user, wherein the second user input identifies the second thread as a selected thread to be concurrently displayed with the first thread.

15. The computing device of claim 10, wherein causing the client computing device of the user to concurrently display the one or more messages of the second set of messages of the second thread with at least the portion of the first set of messages of the first thread, comprises:
  causing a display of a control element with the first set of messages prior to the display of the second set of messages;
  receiving a selection of the control element for causing the display of the second set of messages; and
  in response to the selection of the control element, causing the client computing device of the user to concurrently display the one or more messages of the second set of messages of the second thread with at least the portion of the first set of messages of the first thread.

16. One or more computer-readable storage media having encoded thereon computer-executable instructions to cause the one or more processing units of a system to:
  receive communication data comprising a first thread having a first set of messages associated with a first user group, wherein the first set of messages of the first thread are displayed on a user interface rendered on a client computing device of a user;
  receiving an indication identifying a second thread from a plurality of threads each associated with individual user groups, wherein the indication is provided by a user that has permissions to read and write messages with the first thread and the second thread, wherein the indication is provided by receiving a user input at a graphical element, wherein the second thread comprises a second set of messages associated with a second user group, wherein the user is a common member of the first user group and the second user group;
  responsive to the identification of the second thread from the plurality of threads, cause an update to a data structure to maintain a link relationship between the first thread and the second thread, wherein the link relationship is configured to control a display of the first thread and the second thread;
  receiving a selection of the first thread for display of at least a portion of the first set of messages;
  in response to receiving a selection of the first thread for display of at least a portion of the first set of messages, analyzing the data structure to verify the link relationship between the first thread and the second thread; and
  in response to verifying the link relationship between the first thread and the second thread, cause the client computing device of the user to concurrently display one or more messages of the second set of messages of the second thread with at least a portion of the first set of messages of the first thread.

17. The one or more computer-readable storage media of claim 16, wherein permission data for the first thread only allows a first user group to view and write to the messages of the first thread, wherein permission data for the second thread only allows a second user group to view and write to the messages of the second thread, wherein the permission data is modified in response to the identification of the second thread from the plurality of threads to allow the one or more computers of the first user group to display the messages of the second thread while restricting the one or more computers of the first user group to edit the messages of the second thread or restricting the one or more computers of the first user group to add new messages to the second thread, wherein the second set of messages and the first set of messages are concurrent displayed while the separate storage of the first set of messages of the first thread in the first container and storage of the second set of messages of the second thread in a second container is maintained.

18. The one or more computer-readable storage media of claim 16, wherein the instructions further cause the one or more processing units of the system to:
  in response to receiving a first additional message directed to the first user group, cause an update to the first container to store the first additional message within the first container;
  cause a display of the first additional message to be displayed within an arrangement of the first set of messages of the first thread;
  in response to receiving a second additional message directed to the second user group, cause an update to the second container to store the second additional message within the second container; and
  cause a display of the second additional message to be displayed within an arrangement of the second set of messages of the second thread, wherein the second additional message is concurrently displayed with the first additional message.

19. The one or more computer-readable storage media of claim 16, wherein the client computing device of the user concurrently displays the second set of messages of the second thread with at least a portion of the first set of messages of the first thread while maintaining storage of the first set of messages of the first thread in a first container separate from storage of the second set of messages of the second thread in a second container.

20. The one or more computer-readable storage media of claim 16, wherein causing the client computing device of the user to concurrently display the one or more messages of the second set of messages of the second thread with at least the portion of the first set of messages of the first thread, comprises:
  causing a display of a control element with the first set of messages prior to the display of the second set of messages;
  receiving a selection of the control element for causing the display of the second set of messages; and
  in response to the selection of the control element, causing the client computing device of the user to concurrently display the one or more messages of the second set of messages of the second thread with at least the portion of the first set of messages of the first thread.

* * * * *